United States Patent
Zhiyu

(10) Patent No.: US 11,988,815 B2
(45) Date of Patent: *May 21, 2024

(54) IMAGING LENS

(71) Applicant: TOKYO VISIONARY OPTICS CO., LTD., Tokyo (JP)

(72) Inventor: Huang Zhiyu, Tokyo (JP)

(73) Assignee: TOKYO VISIONARY OPTICS Co., Ltd., Tokyo (JP)

( * ) Notice: Subject to any disclaimer, the term of this patent is extended or adjusted under 35 U.S.C. 154(b) by 5 days.

This patent is subject to a terminal disclaimer.

(21) Appl. No.: 17/391,913

(22) Filed: Aug. 2, 2021

(65) Prior Publication Data

US 2022/0163774 A1 May 26, 2022

Related U.S. Application Data

(63) Continuation of application No. 17/111,062, filed on Dec. 3, 2020.

(30) Foreign Application Priority Data

Dec. 3, 2019 (JP) .................................. 2019-219061

(51) Int. Cl.
G02B 13/00 (2006.01)
G02B 9/62 (2006.01)
G02B 27/00 (2006.01)

(52) U.S. Cl.
CPC .......... *G02B 13/0045* (2013.01); *G02B 9/62* (2013.01); *G02B 27/0025* (2013.01)

(58) Field of Classification Search
CPC ........ G02B 13/0045; G02B 9/62; G02B 9/64; G02B 27/0025; G02B 13/18
See application file for complete search history.

(56) References Cited

U.S. PATENT DOCUMENTS

2012/0314304 A1* 12/2012 Huang ............... G02B 13/0045
359/759
2013/0148006 A1* 6/2013 Yoshinaga ............... G02B 9/14
359/708
(Continued)

FOREIGN PATENT DOCUMENTS

CN 109828355 A 5/2019
TW 201523062 A * 6/2015 ......... G02B 13/0045
(Continued)

OTHER PUBLICATIONS

WO-2014162779 Nabeta, English translation-foreign reference is included at the end of the translation (Year: 2014).*
(Continued)

*Primary Examiner* — George G. King
*Assistant Examiner* — Anna Smith
(74) *Attorney, Agent, or Firm* — Maine Cernota & Curran

(57) ABSTRACT

There is provided an imaging lens with excellent optical characteristics which satisfies demand of a low profile and a low F-number. An imaging lens comprises in order from an object side to an image side, a first lens with positive refractive power being formed in a meniscus shape having an object-side surface being convex in a paraxial region, a second lens with positive refractive power in a paraxial region, a third lens with negative refractive power in a paraxial region, a fourth lens with positive refractive power in a paraxial region, a fifth lens having aspheric surfaces on both sides, and a sixth lens with negative refractive power having an image-side surface being concave in a paraxial region, and predetermined conditional expressions are satisfied.

5 Claims, 10 Drawing Sheets

(56) References Cited

U.S. PATENT DOCUMENTS

2016/0178871 A1* 6/2016 You .................... G02B 13/0045
                                                        359/713
2017/0023769 A1* 1/2017 Jo ...................... G02B 13/0045
2020/0209571 A1   7/2020 Yamazaki et al.

FOREIGN PATENT DOCUMENTS

TW          677731 B1 * 11/2019
TW        202014753 A  *  4/2020
WO   WO-2014162779 A1 * 10/2014  ......... G02B 13/0045

OTHER PUBLICATIONS

TW-201523062, Chen, English translation-foreign reference is included at the end of the translation (Year: 2015).*
TW-677731, Chang, English translation-foreign reference is included at the end of the translation (Year: 2019).*
TW-202014753, Chang, Elgish translation-foreign reference is included at the end of the translation (Year: 2020).*

* cited by examiner

IMAGING LENS

BACKGROUND OF THE INVENTION

Field of the Invention

The present invention relates to an imaging lens which forms an image of an object on a solid-state image sensor such as a CCD sensor or a C-MOS sensor used in an imaging device.

Description of the Related Art

In recent years, it becomes common that camera function is mounted in various products, such as information terminal equipment, home appliances, automobiles, and the like. Development of products with the camera function will be made accordingly.

The imaging lens mounted in such equipment is required to be compact and to have high-resolution performance.

As a conventional imaging lens aiming high performance, for example, the imaging lens disclosed in the following Patent Document 1 has been known.

Patent Document 1 (CN109828355A) discloses an imaging lens comprising, in order from an object side, a first lens, a second lens with positive refractive power, a third lens with positive refractive power, a fourth lens, a fifth lens, and a sixth lens, and a relationship between a focal length of the first lens and a focal length of the second lens, and a relationship between a paraxial curvature radius of an object-side surface of the second lens and a paraxial curvature radius of an image-side surface of the second satisfy a certain condition.

SUMMARY OF THE INVENTION

However, in lens configurations disclosed in the Patent Document 1, when a low profile and a low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the low profile and the low F-number in well balance and excellently corrects aberrations.

Regarding terms used in the present invention, "a convex surface (a surface being convex)", "a concave surface (a surface being concave)" or "a flat surface (a surface being flat)" of lens surfaces implies a shape of the lens surface in a paraxial region (near the optical axis). "Refractive power" implies the refractive power in a paraxial region. "A pole point" implies an off-axial point on an aspheric surface at which a tangential plane intersects the optical axis perpendicularly. "A total track length" is defined as a distance along the optical axis from an object-side surface of an optical element located closest to the object to an image plane. "The total track length" and "a back focus" is a distance obtained when thickness of an IR cut filter or a cover glass which may be arranged between the imaging lens and the image plane is converted into an air-converted distance.

An imaging lens according to the present invention comprises, in order from an object side to an image side, a first lens with positive refractive power being formed in a meniscus shape having an object-side surface being convex in a paraxial region, a second lens with positive refractive power in a paraxial region, a third lens with negative refractive power in a paraxial region, a fourth lens with positive refractive power in a paraxial region, a fifth lens having aspheric surfaces on both sides, and a sixth lens with negative refractive power having an image-side surface being concave in a paraxial region.

The first lens achieves reduction in a profile of the imaging lens by strengthening the refractive power. Furthermore, when the first lens has the object-side surface being convex in the paraxial region, spherical aberration and distortion are properly suppressed.

The second lens achieves reduction in the profile, and properly corrects astigmatism, field curvature and the distortion.

The third lens properly corrects chromatic aberration, coma aberration, the astigmatism, and the distortion.

The fourth lens achieves reduction in the profile, and properly corrects the astigmatism and the distortion.

The fifth lens properly corrects the astigmatism, the field curvature, and the distortion.

The sixth lens properly corrects the chromatic aberration, the astigmatism, the field curvature, and the distortion. Furthermore, when the sixth lens has the image-side surface being concave in the paraxial region, a back focus can be secured while maintaining a low profile.

According to the imaging lens having the above-described configuration, it is preferable that the second lens has an image-side surface being convex in the paraxial region.

When the second lens has the image-side surface being convex in the paraxial region, the astigmatism, the field curvature, and the distortion can be properly corrected.

According to the imaging lens having the above-described configuration, it is preferable that the fourth lens has an image-side surface being convex in the paraxial region.

When the fourth lens has the image-side surface being convex in the paraxial region, the astigmatism and the distortion can be properly corrected.

According to the imaging lens having the above-described configuration, it is preferable that the sixth lens has an object-side surface being convex in the paraxial region.

When the sixth lens has the object-side surface being convex in the paraxial region, the astigmatism, the field curvature, and the distortion can be properly corrected.

According to the imaging lens having the above-described configuration, it is preferable that an object-side surface of the fifth lens is formed as an aspheric surface having at least one pole point in a position off the optical axis.

When the object-side surface of the fifth lens is formed as an aspheric surface having at least one pole point in a position off the optical axis, the astigmatism and the distortion can be properly corrected.

According to the imaging lens having the above-described configuration, it is preferable that an image-side surface of the fifth lens is formed as an aspheric surface having at least one pole point in a position off the optical axis.

When the image-side surface of the fifth lens is formed as an aspheric surface having at least one pole point in a position off the optical axis, the astigmatism and the distortion can be properly corrected.

According to the imaging lens having the above-described configuration, it is preferable that the following conditional expression (1) is satisfied:

$$0.30 < f1/f4 < 1.85 \quad (1)$$

where
f1: a focal length of the first lens, and
f4: a focal length of the fourth lens.

The conditional expression (1) defines an appropriate range of a relationship between the focal length of the first lens and the focal length of the fourth lens. By satisfying the conditional expression (1), refractive powers of the first lens and the fourth lens can be appropriately balanced. As a result, reduction in the profile can be achieved, the spherical aberration, the astigmatism, and the distortion can be properly corrected.

According to the imaging lens having the above-described configuration, it is preferable that the following conditional expression (2) is satisfied:

$$-3.30 < r6/f < -0.70 \quad (2)$$

where
r6: a paraxial curvature radius of an image-side surface of the third lens, and
f: a focal length of the overall optical system of the imaging lens.

The conditional expression (2) defines an appropriate range of the paraxial curvature radius of the image-side surface of the third lens. By satisfying the conditional expression (2), the coma aberration, the astigmatism, and the distortion can be properly corrected.

According to the imaging lens having the above-described configuration, it is preferable that the following conditional expression (3) is satisfied:

$$15.00 < vd6 < 36.00 \quad (3)$$

where
vd6: an abbe number at d-ray of the sixth lens.

The conditional expression (3) defines an appropriate range of the abbe number at d-ray of the sixth lens. By satisfying the conditional expression (3), the chromatic aberration can be properly corrected.

According to the imaging lens having the above-described configuration, it is preferable that the following conditional expression (4) is satisfied:

$$1.50 < (T2/f2) \times 100 < 5.50 \quad (4)$$

where
T2: a distance along the optical axis from an image-side surface of the second lens to an object-side surface of the third lens, and
f2: a focal length of the second lens.

The conditional expression (4) defines an appropriate range of a relationship between the distance along the optical axis from the image-side surface of the second lens to the object-side surface of the third lens and the focal length of the second lens. By satisfying the conditional expression (4), reduction in the profile can be achieved, refractive power of the second lens becomes appropriate, and the astigmatism, the field curvature, and the distortion can be properly corrected.

According to the imaging lens having the above-described configuration, it is preferable that the following conditional expression (5) is satisfied:

$$-12.50 < r6/r12 < -3.20 \quad (5)$$

where
r6: a paraxial curvature radius of an image-side surface of the third lens, and
r12: a paraxial curvature radius of an image-side surface of the sixth lens.

The conditional expression (5) defines an appropriate range of a relationship between the paraxial curvature radius of the image-side surface of the third lens and the paraxial curvature radius of the image-side surface of the sixth lens.

By satisfying the conditional expression (5), the coma aberration, the astigmatism, the field curvature, and the distortion can be properly corrected.

According to the imaging lens having the above-described configuration, it is preferable that the following conditional expression (6) is satisfied:

$$-3.50 < r8/r11 < -1.10 \quad (6)$$

where
r8: a paraxial curvature radius of an image-side surface of the fourth lens, and
r11: a paraxial curvature radius of an object-side surface of the sixth lens.

The conditional expression (6) defines an appropriate range of a relationship between the paraxial curvature radius of the image-side surface of the fourth lens and the paraxial curvature radius of the object-side surface of the sixth lens. By satisfying the conditional expression (6), the astigmatism, the field curvature, and the distortion can be properly corrected.

According to the imaging lens having the above-described configuration, it is preferable that the following conditional expression (7) is satisfied:

$$0.40 < r2/r4/r6 < 1.20 \quad (7)$$

where
r2: a paraxial curvature radius of an image-side surface of the first lens,
r4: a paraxial curvature radius of an image-side surface of the second lens, and
r6: a paraxial curvature radius of an image-side surface of the third lens.

The conditional expression (7) defines an appropriate range of a relationship among the paraxial curvature radius of the image-side surface of the first lens, the paraxial curvature radius of the image-side surface of the second lens, and the paraxial curvature radius of the image-side surface of the third lens. By satisfying the conditional expression (7), the coma aberration, the astigmatism, the field curvature, and the distortion can be properly corrected.

According to the imaging lens having the above-described configuration, it is preferable that the following conditional expression (8) is satisfied:

$$3.75 < |r3|/f < 70.00 \quad (8)$$

where
r3: a paraxial curvature radius of an object-side surface of the second lens, and
f: a focal length of the overall optical system of the imaging lens.

The conditional expression (8) defines an appropriate range of the paraxial curvature radius of the object-side surface of the second lens. By satisfying the conditional expression (8), the astigmatism, the field curvature, and the distortion can be properly corrected.

According to the imaging lens having the above-described configuration, it is preferable that the following conditional expression (9) is satisfied:

$$-2.15 < r4/f < -1.00 \quad (9)$$

where
r4: a paraxial curvature radius of an image-side surface of the second lens, and
f: a focal length of the overall optical system of the imaging lens.

The conditional expression (9) defines an appropriate range of the paraxial curvature radius of the image-side surface of the second lens. By satisfying the conditional expression (9), the astigmatism, the field curvature, and the distortion can be properly corrected.

According to the imaging lens having the above-described configuration, it is preferable that the following conditional expression (10) is satisfied:

$$4.00<(T1/f1)\times 100<11.00 \tag{10}$$

where
T1: a distance along the optical axis from an image-side surface of the first lens to an object-side surface of the second lens, and
f1: a focal length of the first lens.

The conditional expression (10) defines an appropriate range of a relationship between the distance along the optical axis from the image-side surface of the first lens to the object-side surface of the second lens, and the focal length of the first lens. By satisfying the conditional expression (10), reduction in the profile can be achieved, and the spherical aberration and the distortion can be properly corrected.

According to the imaging lens having the above-described configuration, it is preferable that the following conditional expression (11) is satisfied:

$$1.50<T2/T4<7.25 \tag{11}$$

where
T2: a distance along the optical axis from an image-side surface of the second lens to an object-side surface of the third lens, and
T4: a distance along the optical axis from an image-side surface of the fourth lens to an object-side surface of the fifth lens.

The conditional expression (11) defines an appropriate range of a relationship between the distance along the optical axis from the image-side surface of the second lens to the object-side surface of the third lens, and the distance along the optical axis from the image-side surface of the fourth lens to the object-side surface of the fifth lens. By satisfying the conditional expression (11), reduction in the profile can be achieved, and the coma aberration, the astigmatism, and the distortion can be properly corrected.

According to the imaging lens having the above-described configuration, it is preferable that the following conditional expression (12) is satisfied:

$$0.70<f1/f<1.95 \tag{12}$$

where
f1: a focal length of the first lens, and
f: a focal length of the overall optical system of the imaging lens.

The conditional expression (12) defines an appropriate range of the focal length of the first lens. By satisfying the conditional expression (12), reduction in the profile can be achieved, and the spherical aberration and the distortion can be properly corrected.

According to the imaging lens having the above-described configuration, it is preferable that the following conditional expression (13) is satisfied:

$$0.30<f1/f2<0.95 \tag{13}$$

where
f1: a focal length of the first lens, and
f2: a focal length of the second lens.

The conditional expression (13) defines an appropriate range of a relationship between the focal length of the first lens and the focal length of the second lens. By satisfying the conditional expression (13), refractive powers of the first lens and the second lens can be appropriately balanced. As a result, reduction in the profile can be achieved, and the spherical aberration, the astigmatism, the field curvature, and the distortion can be properly corrected.

According to the imaging lens having the above-described configuration, it is preferable that the following conditional expression (14) is satisfied:

$$-2.00<f3/f4<-0.70 \tag{14}$$

where
f3: a focal length of the third lens, and
f4: a focal length of the fourth lens.

The conditional expression (14) defines an appropriate range of a relationship between the focal length of the third lens and the focal length of the fourth lens. By satisfying the conditional expression (14), refractive powers of the third lens and the fourth lens can be appropriately balanced. As a result, the coma aberration, the astigmatism, and the distortion can be properly corrected.

According to the imaging lens having the above-described configuration, it is preferable that the following conditional expression (15) is satisfied:

$$-40.00<f6/f1<-0.60 \tag{15}$$

where
f6: a focal length of the sixth lens, and
f1: a focal length of the first lens.

The conditional expression (15) defines an appropriate range of a relationship between the focal length of the sixth lens and the focal length of the first lens. By satisfying the conditional expression (15), refractive powers of the sixth lens and the first lens can be appropriately balanced. As a result, reduction in the profile can be achieved, and the chromatic aberration, the spherical aberration, the astigmatism, the field curvature, and the distortion can be properly corrected.

According to the imaging lens having the above-described configuration, it is preferable that the following conditional expression (16) is satisfied:

$$-7.50<r2/r4<-1.55 \tag{16}$$

where
r2: a paraxial curvature radius of an image-side surface of the first lens, and
r4: a paraxial curvature radius of an image-side surface of the second lens.

The conditional expression (16) defines an appropriate range of a relationship between the paraxial curvature radius of the image-side surface of the first lens, and the paraxial curvature radius of the image-side surface of the second lens. By satisfying the conditional expression (16), the astigmatism, the field curvature, and the distortion can be properly corrected.

According to the imaging lens having the above-described configuration, it is preferable that the following conditional expression (17) is satisfied:

$$20.00<r2/T2<160.00 \tag{17}$$

where
r2: a paraxial curvature radius of an image-side surface of the first lens, and
T2: a distance along the optical axis from an image-side surface of the second lens to an object-side surface of the third lens.

The conditional expression (17) defines an appropriate range of a relationship between the paraxial curvature radius of the image-side surface of the first lens, and the distance along the optical axis from an image-side surface of the second lens to an object-side surface of the third lens. By satisfying the conditional expression (17), the astigmatism and the distortion can be properly corrected.

According to the imaging lens having the above-described configuration, it is preferable that the following conditional expression (18) is satisfied:

$$2.00<|r3|/f2<22.00 \tag{18}$$

where r3: a paraxial curvature radius of an object-side surface of the second lens, and f2: a focal length of the second lens.

The conditional expression (18) defines an appropriate range of a relationship between the paraxial curvature radius of the object-side surface of the second lens and the focal length of the second lens. By satisfying the conditional expression (18), reduction in the profile can be achieved, and the astigmatism, the field curvature, and the distortion can be properly corrected.

According to the imaging lens having the above-described configuration, it is preferable that the following conditional expression (19) is satisfied:

$$0.30<r4/r6<2.20 \tag{19}$$

where r4: a paraxial curvature radius of an image-side surface of the second lens, and r6: a paraxial curvature radius of an image-side surface of the third lens.

The conditional expression (19) defines an appropriate range of a relationship between the paraxial curvature radius of the image-side surface of the second lens and the paraxial curvature radius of the image-side surface of the third lens. By satisfying the conditional expression (19), the coma aberration, the astigmatism, the field curvature, and the distortion can be properly corrected.

According to the imaging lens having the above-described configuration, it is preferable that the following conditional expression (20) is satisfied:

$$3.90<|r7|/f \tag{20}$$

where r7: a paraxial curvature radius of an object-side surface of the fourth lens, and f: a focal length of the overall optical system of the imaging lens.

The conditional expression (20) defines an appropriate range of the paraxial curvature radius of the object-side surface of the fourth lens. By satisfying the conditional expression (20), the astigmatism and the distortion can be properly corrected.

According to the imaging lens having the above-described configuration, it is preferable that the following conditional expression (21) is satisfied:

$$-1.05<r8/f<-0.50 \tag{21}$$

where r8: a paraxial curvature radius of an image-side surface of the fourth lens, and f: a focal length of the overall optical system of the imaging lens.

The conditional expression (21) defines an appropriate range of the paraxial curvature radius of the image-side surface of the fourth lens. By satisfying the conditional expression (21), the astigmatism and the distortion can be properly corrected.

According to the imaging lens having the above-described configuration, it is preferable that the following conditional expression (22) is satisfied:

$$0.30<r11/r12<2.00 \tag{22}$$

where r11: a paraxial curvature radius of an object-side surface of the sixth lens, and r12: a paraxial curvature radius of an image-side surface of the sixth lens.

The conditional expression (22) defines an appropriate range of the paraxial curvature radius of the object-side surface of the sixth lens. By satisfying the conditional expression (22), the astigmatism, the field curvature, and the distortion can be properly corrected.

Effect of Invention

According to the present invention, there can be provided an imaging lens with high resolution which satisfies demand of the low profile and the low F-number in well balance, and properly corrects aberrations.

DETAILED DESCRIPTION OF THE PREFERRED EMBODIMENT

Figure 1:
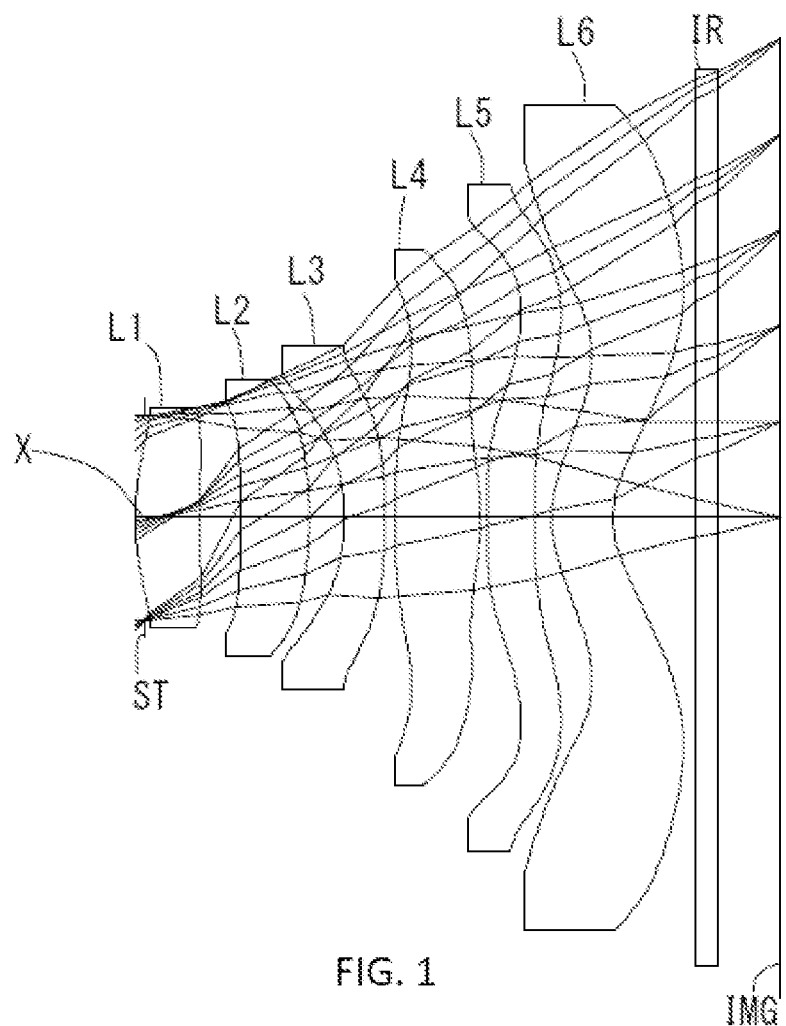
FIG. 1 is a schematic view showing an imaging lens in Example 1 according to the present invention.

Hereinafter, the preferred embodiment of the present invention will be described in detail referring to the accompanying drawings.

FIGS. 1, 3, 5, 7, 9, 11, 13, 15, 17, and 19 are schematic views of the imaging lenses in Examples 1 to 10 according to the embodiments of the present invention, respectively.

The imaging lens according to the present invention comprises, in order from an object side to an image side, a first lens L1 with positive refractive power being formed in a meniscus shape having an object-side surface being convex in a paraxial region, a second lens L2 with positive refractive power in a paraxial region, a third lens L3 with negative refractive power in a paraxial region, a fourth lens L4 with positive refractive power in a paraxial region, a fifth lens L5 having aspheric surfaces on both sides, and a sixth lens L6 with negative refractive power having an image-side surface being concave in a paraxial region.

A filter IR such as an IR cut filter or a cover glass is arranged between the sixth lens L6 and an image plane IMG (namely, the image plane of an image sensor). The filter IR is omissible.

By arranging an aperture stop ST on the object side of the first lens L1, correction of aberrations and control of an incident angle of the light ray of high image height to an image sensor become facilitated.

The first lens L1 has the positive refractive power and is formed in a meniscus shape having the object-side surface being convex and an image-side surface being concave in a paraxial region (near the optical axis X). Therefore, reduction in a profile is achieved, and astigmatism and distortion are suppressed by strengthening the refractive power. Furthermore, when the object-side surface is convex in the paraxial region, spherical aberration and the distortion are suppressed.

The second lens L2 has the positive refractive power and is formed in a meniscus shape having the object-side surface being concave and an image-side surface being convex in a paraxial region (near the optical axis X). Therefore, reduction in a profile is achieved, and the astigmatism, field curvature and the distortion are properly corrected. Furthermore, when the image-side surface is convex in the paraxial region, the astigmatism, the field curvature, and the distortion are more properly corrected.

The second lens L2 may be formed in a biconvex shape having the object-side surface and the image-side surface being convex in the paraxial region (near the optical axis X) as in Examples 7, 8, 9, and 10 shown in FIGS. 13, 15, 17, and 19. In this case, reduction in the profile is favorably achieved by the positive refractive powers on both surfaces.

The third lens L3 has the negative refractive power and is formed in a meniscus shape having an object-side surface being concave and an image-side surface being convex in a paraxial region (near the optical axis X). Therefore, chromatic aberration, coma aberration, the astigmatism, and the distortion are properly corrected.

The fourth lens L4 has the positive refractive power and is formed in a biconvex shape having an object-side surface being convex and an image-side surface being convex in a paraxial region (near the optical axis X). Therefore, reduction in the profile is achieved and the astigmatism and the distortion are properly corrected. Furthermore, when the image-side surface is convex in the paraxial region, the astigmatism and the distortion are more properly corrected.

Figure 19:
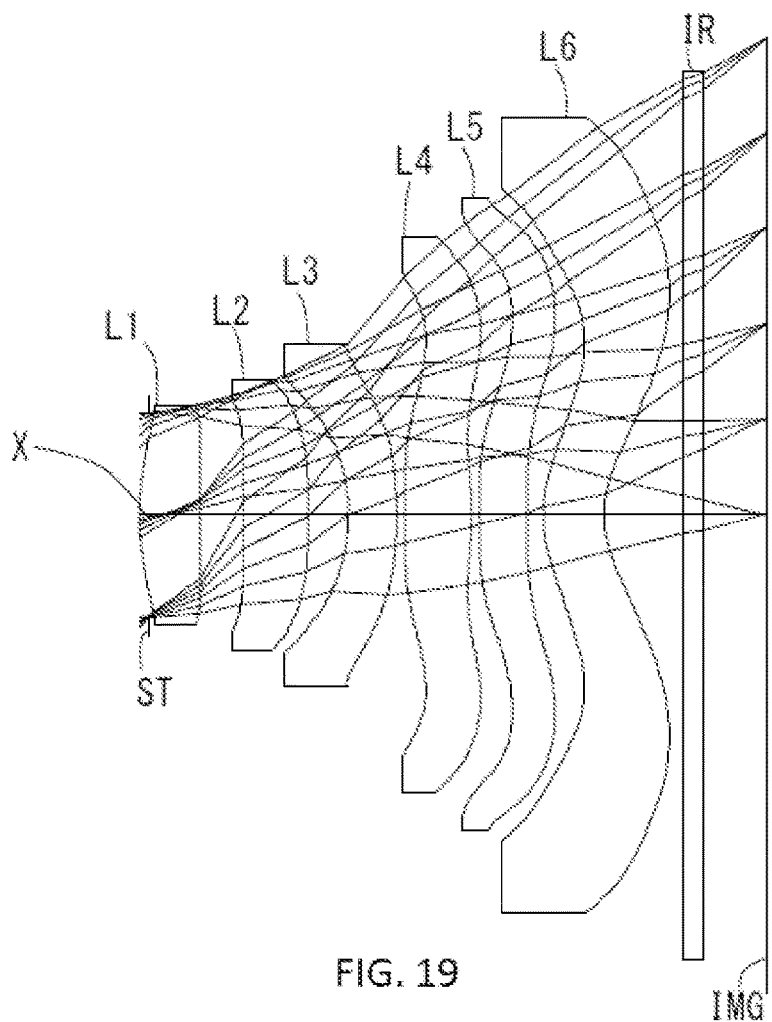
FIG. 19 is a schematic view showing an imaging lens in Example 10 according to the present invention.

The fourth lens L4 may be formed in a meniscus shape having the object-side surface being concave and the image-side surface being convex in the paraxial region (near the optical axis X) as in an Example 10 shown in FIG. 19. In this case, a light ray incident angle to the fourth lens L4 can be appropriately controlled, and the astigmatism and the distortion can be properly corrected.

The fifth lens L5 substantially has no refractive power, and is formed in a shape having an object-side surface and an image-side surface which are flat in a paraxial region (near the optical axis X). Therefore, the astigmatism, the field curvature, and the distortion are properly corrected by aspheric surfaces on both sides without affecting a focal length of the overall optical system of the imaging lens.

Figure 7:
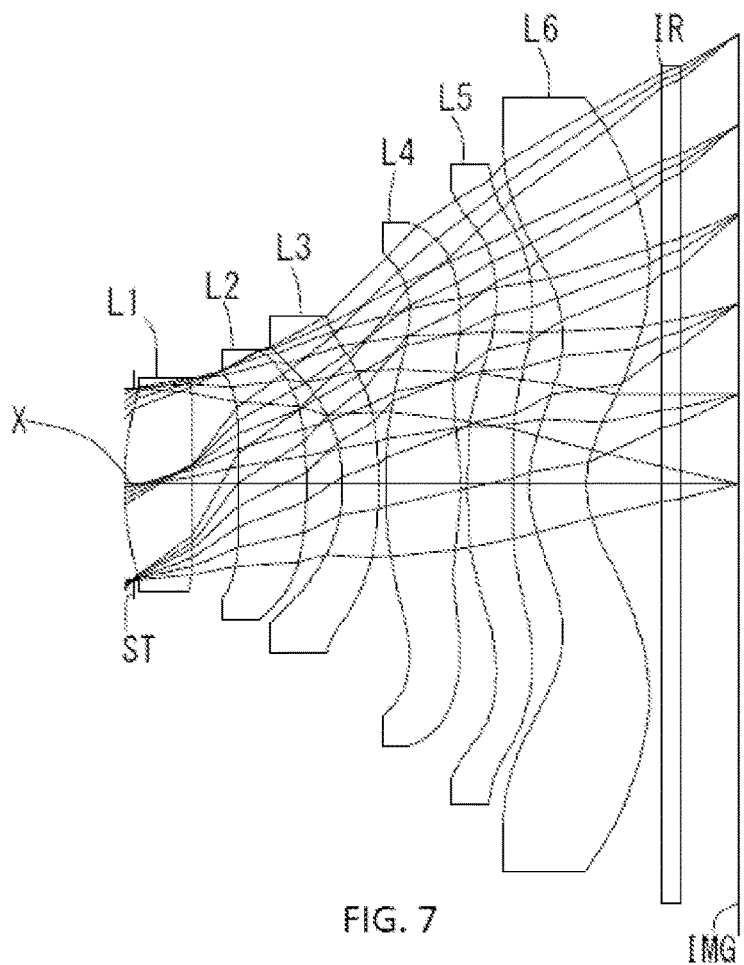
FIG. 7 is a schematic view showing an imaging lens in Example 4 according to the present invention.
Figure 11:
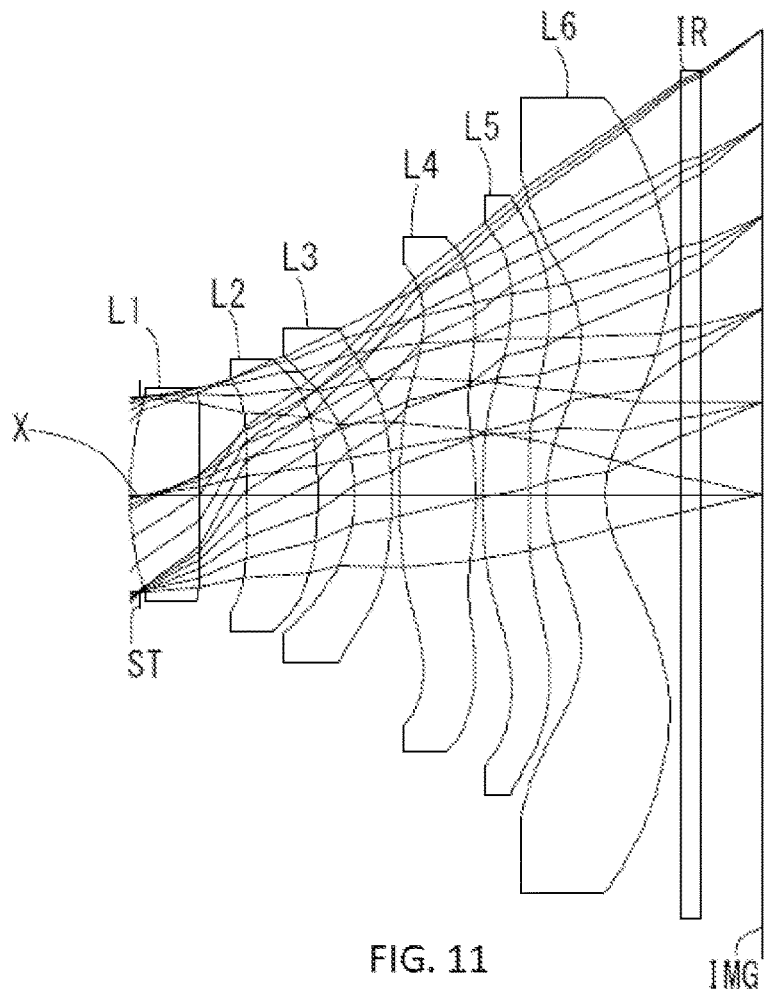
FIG. 11 is a schematic view showing an imaging lens in Example 6 according to the present invention.

The fifth lens L5 may have positive refractive power as in Examples 4 and 6 shown in FIGS. 7 and 11. In this case, reduction in the profile is favorably achieved. Furthermore, the fifth lens L5 may have negative refractive power as in the Examples 5, 7, and 8 shown in FIGS. 9, 13, and 15. In this case, the chromatic aberration is favorably corrected.

The fifth lens L5 may be formed in a biconvex shape having the object-side surface being convex and the image-side surface being convex in the paraxial region as in the Examples 4 and 6 shown in FIGS. 7 and 11. In this case, reduction in the profile is favorably achieved by positive refractive powers on both sides. Furthermore, the fifth lens L5 may be formed in a biconcave shape having the object-side surface being concave and the image-side surface being concave in the paraxial region as in the Example 5 shown in FIG. 9. In this case, the chromatic aberration can be favorably corrected by the negative refractive powers on the both sides. Furthermore, the fifth lens L5 may be formed in a meniscus shape having the object-side surface being convex and the image-side surface being concave in the paraxial region as in the Examples 7 and 8 shown in FIGS. 13 and 15. In this case, the astigmatism and the distortion can be properly corrected.

The object-side surface of the fifth lens L5 is formed as an aspheric surface having at least one pole point in a position off the optical axis X. Therefore, the astigmatism and the distortion are more properly corrected.

The image-side surface of the fifth lens L5 is formed as an aspheric surface having at least one pole point in a position off the optical axis X. Therefore, the astigmatism and the distortion are more properly corrected.

The sixth lens L6 has the negative refractive power and is formed in a meniscus shape having the object-side surface being convex and an image-side surface being concave in a paraxial region (near the optical axis X). Therefore, the chromatic aberration, the astigmatism, the field curvature, and the distortion are properly corrected. Furthermore, when the sixth lens L6 has the image-side surface being concave in the paraxial region, the low profile is maintained and a back focus is secured.

Regarding the imaging lens according to the present embodiments, it is preferable that all lenses of the first lens L1 to the sixth lens L6 are single lenses. Configuration only with the single lenses can frequently use the aspheric surfaces. In the present embodiments, all lens surfaces are formed as appropriate aspheric surfaces, and the aberrations are favorably corrected. Furthermore, in comparison with a case in which a cemented lens is used, workload is reduced, and manufacturing in low cost becomes possible.

Furthermore, the imaging lens according to the present embodiments makes manufacturing facilitated by using a plastic material for the lenses, and mass production in a low cost can be realized.

The material applied to the lens is not limited to the plastic material. By using glass material, further high performance may be aimed. It is preferable that all of lens-surfaces are formed as aspheric surfaces, however, spherical surfaces easy to be manufactured may be adopted in accordance with required performance.

The imaging lens according to the present embodiments shows preferable effect by satisfying the following conditional expressions (1) to (22).

$$0.30 < f1/f4 < 1.85 \tag{1}$$

$$-3.30 < r6/f < -0.70 \tag{2}$$

$$15.00 < vd6 < 36.00 \tag{3}$$

$$1.50 < (T2/f2) \times 100 < 5.50 \tag{4}$$

$$-12.50 < r6/r12 < -3.20 \tag{5}$$

$$-3.50 < r8/r11 < -1.10 \tag{6}$$

$$0.40 < r2/r4/r6 < 1.20 \tag{7}$$

$$3.75 < |r3|/f < 70.00 \tag{8}$$

$$-2.15 < r4/f < -1.00 \tag{9}$$

$$4.00 < (T1/f1) \times 100 < 11.00 \tag{10}$$

$$1.50 < T2/T4 < 7.25 \tag{11}$$

$$0.70 < f1/f < 1.95 \tag{12}$$

$$0.30 < f1/f2 < 0.95 \tag{13}$$

$$-2.00 < f3/f4 < -0.70 \tag{14}$$

$$-40.00 < f6/f1 < -0.60 \tag{15}$$

$$-7.50 < r2/r4 < -1.55 \tag{16}$$

$$20.00 < r2/T2 < 160.00 \tag{17}$$

$$2.00 < |r3|/f2 < 22.00 \tag{18}$$

$$0.30 < r4/r6 < 2.20 \tag{19}$$

$$3.90 < |r7|/f \tag{20}$$

$$-1.05 < r8/f < -0.50 \tag{21}$$

$$0.30 < r11/r12 < 2.00 \tag{22}$$

where
vd6: an abbe number at d-ray of the sixth lens,
T1: a distance along the optical axis from an image-side surface of the first lens to an object-side surface of the second lens,
T2: a distance along the optical axis from an image-side surface of the second lens to an object-side surface of the third lens,
T4: a distance along the optical axis from an image-side surface of the fourth lens to an object-side surface of the fifth lens,
f: a focal length of the overall optical system of the imaging lens,
f1: a focal length of the first lens,
f2: a focal length of the second lens,
f3: a focal length of the third lens,
f4: a focal length of the fourth lens,
f6: a focal length of the sixth lens,
r2: a paraxial curvature radius of an image-side surface of the first lens,
r3: a paraxial curvature radius of an object-side surface of the second lens,
r4: a paraxial curvature radius of an image-side surface of the second lens,
r6: a paraxial curvature radius of an image-side surface of the third lens,
r7: a paraxial curvature radius of an object-side surface of the fourth lens,
r8: a paraxial curvature radius of an image-side surface of the fourth lens,
r11: a paraxial curvature radius of an object-side surface of the sixth lens, and
r12: a paraxial curvature radius of an image-side surface of the sixth lens.

It is not necessary to satisfy the above all conditional expressions, and by satisfying the conditional expression individually, operational advantage corresponding to each conditional expression can be obtained.

The imaging lens according to the present embodiments shows further preferable effect by satisfying the below conditional expressions (1a) to (22a).

$$0.80 < f1/f4 < 1.75 \tag{1a}$$

$$-2.70 < r6/f < -0.85 \tag{2a}$$

$$20.00 < vd6 < 30.00 \tag{3a}$$

$$1.90 < (T2/f2) \times 100 < 5.00 \tag{4a}$$

$$-10.50 < r6/r12 < -3.60 \tag{5a}$$

$$-2.90 < r8/r11 < -1.40 \tag{6a}$$

$$0.45 < r2/r4/r6 < 1.00 \tag{7a}$$

$$4.25 < |r3|/f < 50.00 \tag{8a}$$

$$-1.80 < r4/f < -1.20 \tag{9a}$$

$$5.00 < (T1/f1) \times 100 < 9.00 \tag{10a}$$

$$2.50 < T2/T4 < 6.60 \tag{11a}$$

$$1.10 < f1/f < 1.85 \tag{12a}$$

$$0.45 < f1/f2 < 0.85 \tag{13a}$$

$$-1.65 < f3/f4 < -0.85 \tag{14a}$$

$$-33.00 < f6/f1 < -1.00 \tag{15a}$$

$$-6.00 < r2/r4 < -1.85 \tag{16a}$$

$$25.00 < r2/T2 < 130.00 \tag{17a}$$

$$2.10 < |r3|/f2 < 18.00 \tag{18a}$$

$$0.45 < r4/r6 < 1.85 \tag{19a}$$

$4.10<|r7|/f<230.00$ (20a)

$-0.85<r8/f<-0.55$ (21a)

$0.80<r11/r12<1.75$ (22a)

The signs in the above conditional expressions have the same meanings as those in the paragraph before the preceding paragraph.

In this embodiment, the aspheric shapes of the aspheric surfaces of the lens are expressed by Equation 1, where Z denotes an axis in the optical axis direction, H denotes a height perpendicular to the optical axis, R denotes a paraxial curvature radius, k denotes a conic constant, and A4, A6, A8, A10, A12, A14, A16, A18 and A20 denote aspheric surface coefficients.

$$Z = \frac{\frac{H^2}{R}}{1+\sqrt{1-(k+1)\frac{H^2}{R^2}}} + A_4 H^4 + A_6 H^6 + A_8 H^8 +$$

Equation 1

-continued $$A_{10}H^{10} + A_{12}H^{12} + A_{14}H^{14} + A_{16}H^{16} + A_{18}H^{18} + A_{20}H^{20}$$

Next, examples of the imaging lens according to this embodiment will be explained. In each example, f denotes a focal length of the overall optical system of the imaging lens, Fno denotes an F-number, ω denotes a half field of view, ih denotes a maximum image height, and TTL denotes a total track length. Additionally, i denotes a surface number counted from the object side, r denotes a paraxial curvature radius, d denotes a distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

| Example 1 |
|---|
| Unit mm |
| f = 2.88<br>Fno = 2.00<br>ω(°) = 48.3<br>ih = 3.28<br>TTL = 4.30 |

Surface Data

| i | r | d | Nd | vd | |
|---|---|---|---|---|---|
| (Object) | Infinity | Infinity | | | |
| 1 (Stop) | Infinity | −0.0670 | | | |
| 2* | 2.0052 | 0.4422 | 1.535 | 55.69 | (vd1) |
| 3* | 9.0704 | 0.2769 | | | |
| 4* | −100.0000 | 0.4710 | 1.535 | 55.69 | (vd2) |
| 5* | −3.7276 | 0.2441 | | | |
| 6* | −1.5422 | 0.2776 | 1.671 | 19.24 | (vd3) |
| 7* | −4.8054 | 0.0712 | | | |
| 8* | 42.2461 | 0.5838 | 1.544 | 55.93 | (vd4) |
| 9* | −1.8722 | 0.0500 | | | |
| 10* | Infinity | 0.3230 | 1.671 | 19.24 | (vd5) |
| 11* | Infinity | 0.1156 | | | |
| 12* | 0.8958 | 0.4200 | 1.614 | 25.59 | (vd6) |
| 13* | 0.6663 | 0.5738 | | | |
| 14 | Infinity | 0.1500 | 1.517 | 64.20 | |
| 15 | Infinity | 0.4226 | | | |
| n age P lan | Infinity | | | | |

ConstituentLens Data

| Lens | StartSurface | FocalLength |
|---|---|---|
| 1 | 2 | 4.711 |
| 2 | 4 | 7.227 |
| 3 | 6 | −3.505 |
| 4 | 8 | 3.309 |
| 5 | 10 | Infinity |
| 6 | 12 | −13.928 |

Aspheric Surface Data

| | Second Surface | Third Surface | Fourth Surface | Fifth Surface | Sixth Surface | Seventh Surface |
|---|---|---|---|---|---|---|
| k | 2.695160E+00 | 0.000000E+00 | 0.000000E+00 | 0.000000E+00 | 0.000000E+00 | 0.000000E+00 |
| A4 | −8.501599E−02 | −1.019563E−01 | −2.257212E−01 | −5.769452E−02 | −3.201247E−01 | −4.654746E−02 |
| A6 | 5.188456E−01 | 1.473503E−01 | 1.293837E+00 | −1.349223E+00 | −3.606600E−01 | −5.774310E−01 |
| A8 | −7.567014E+00 | −3.157989E+00 | −8.847578E+00 | 1.070888E+01 | 5.803903E+00 | 1.761854E+00 |

TABLE 1-continued

| | | | | | | |
|---|---|---|---|---|---|---|
| A10 | 4.840881E+01 | 2.158194E+01 | 3.156697E+01 | −4.590306E+01 | −2.303044E+01 | −3.808427E+00 |
| A12 | −1.761968E+02 | −8.744706E+01 | −6.792929E+01 | 1.157749E+02 | 5.114440E+01 | 5.531272E+00 |
| A14 | 3.679086E+02 | 2.091941E+02 | 8.512469E+01 | −1.801261E+02 | −7.091794E+01 | −5.003678E+00 |
| A16 | −4.163666E+02 | −2.936265E+02 | −5.950615E+01 | 1.693321E+02 | 6.193199E+01 | 2.765122E+00 |
| A18 | 2.064688E+02 | 2.239320E+02 | 2.175801E+01 | −8.757393E+01 | −3.102811E+01 | −8.642935E−01 |
| A20 | −1.350499E+01 | −7.177253E+01 | −3.891827E+00 | 1.899342E+01 | 6.707396E+00 | 1.175500E−01 |

| | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | −1.086950E+00 | 0.000000E+00 | −1.877128E+00 | −2.234788E+00 |
| A4 | 4.140514E−01 | 3.343397E−01 | 5.460904E−01 | 3.827443E−01 | −2.351542E−01 | −2.250199E−01 |
| A6 | −7.171448E−01 | 5.174053E−02 | −7.590184E−01 | −4.283287E−01 | 2.603930E−03 | 1.332332E−01 |
| A8 | 8.511346E−01 | −3.248889E−01 | 6.384183E−01 | 2.446807E−01 | 1.124257E−01 | −5.318535E−02 |
| A10 | −8.445475E−01 | 2.163786E−01 | −3.957121E−01 | −9.411352E−02 | −1.068600E−01 | 1.341098E−02 |
| A12 | 5.938949E−01 | −3.930408E−02 | 1.751001E−01 | 2.758204E−02 | 5.055650E−02 | −2.112374E−03 |
| A14 | −2.650621E−01 | −1.709261E−02 | −5.133532E−02 | −6.337035E−03 | −1.350032E−02 | 2.098799E−04 |
| A16 | 7.011443E−02 | 1.057476E−02 | 9.168987E−03 | 1.025913E−03 | 2.060696E−03 | −1.322501E−05 |
| A18 | −9.885222E−03 | −2.205272E−03 | −8.849758E−04 | −9.730627E−05 | −1.678548E−04 | 5.047678E−07 |
| A20 | 5.606143E−04 | 1.738315E−04 | 3.478573E−05 | 3.933122E−06 | 5.674199E−06 | −9.076651E−09 |

The imaging lens in Example 1 satisfies conditional expressions (1) to (22) as shown in Table 11.

Figure 2:
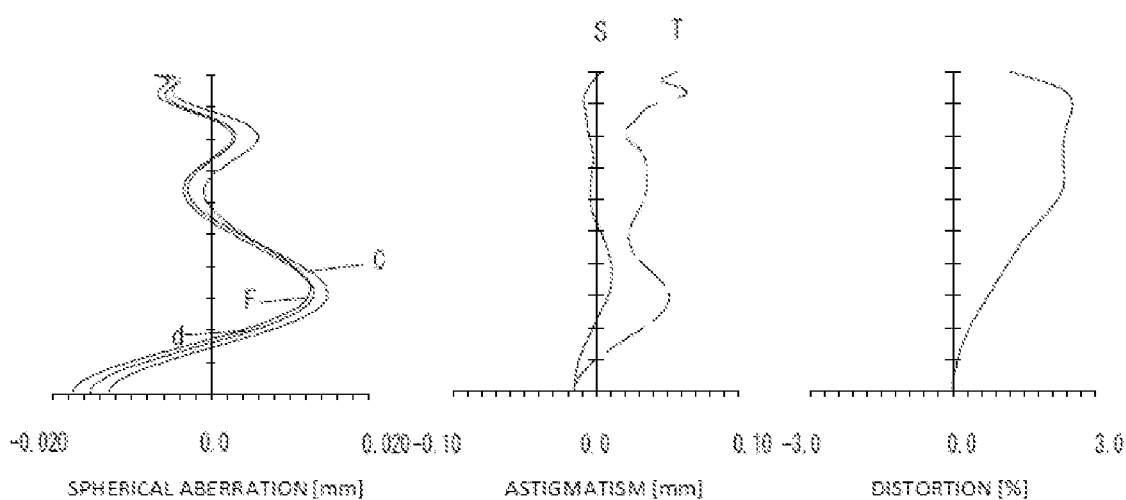
FIG. 2 shows spherical aberration, astigmatism, and distortion of the imaging lens in Example 1 according to the present invention.
Figure 3:
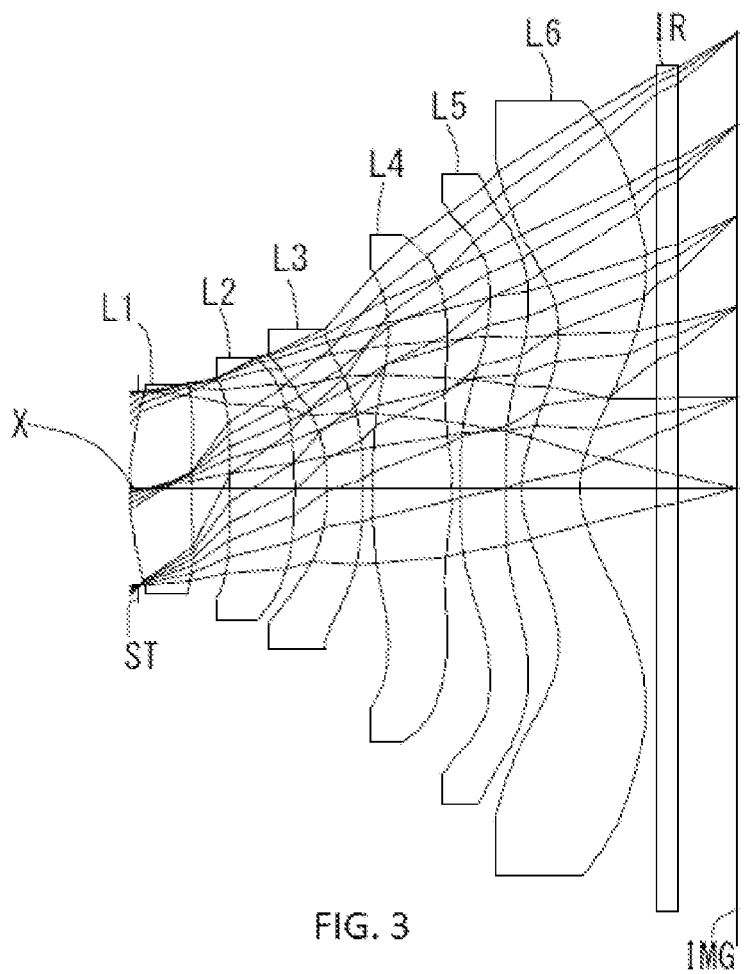
FIG. 3 is a schematic view showing an imaging lens in Example 2 according to the present invention.

FIG. 2 shows spherical aberration (mm), astigmatism (mm), and distortion (%) of the imaging lens in Example 1. The spherical aberration diagram shows the amount of aberration at each wavelength of F-ray (486 nm), d-ray (588 nm), and C-ray (656 nm). The astigmatism diagram shows the amount of aberration at d-ray on a sagittal image surface S (solid line) and the amount of aberration at d-ray on tangential image surface T (broken line), respectively (same as FIGS. 4, 6, 8, 10, 12, 14, 16, 18, and 20). As shown in FIG. 2, each aberration is corrected excellently.

Example 2

The basic lens data is shown below in Table 2.

TABLE 2

Example 2

Unit mm f = 2.89
Fno = 2.00
ω(°) = 48.3
h = 3.28
TTL = 4.26

Surface Data

| i | r | d | Nd | vd | |
|---|---|---|---|---|---|
| (Object) | Infinity | Infinity | | | |
| 1 (Stop) | Infinity | −0.0670 | | | |
| 2* | 2.0390 | 0.4449 | 1.535 | 55.69 | (vd1) |
| 3* | 10.4362 | 0.2736 | | | |
| 4* | −100.0000 | 0.4704 | 1.535 | 55.69 | (vd2) |
| 5* | −3.7545 | 0.2345 | | | |
| 6* | −1.5438 | 0.2577 | 1.671 | 19.24 | (vd3) |
| 7* | −4.2308 | 0.0736 | | | |
| 8* | 76.3714 | 0.5680 | 1.544 | 55.93 | (vd4) |
| 9* | −1.8656 | 0.0651 | | | |
| 10* | Infinity | 0.3230 | 1.671 | 19.24 | (vd5) |
| 11* | Infinity | 0.1156 | | | |
| 12* | 0.9533 | 0.4200 | 1.614 | 25.59 | (vd6) |
| 13* | 0.6908 | 0.5612 | | | |
| 14 | Infinity | 0.1500 | 1.517 | 64.20 | |
| 15 | Infinity | 0.4229 | | | |
| n age P lan | Infinity | | | | |

ConstituentLens Data

| Lens | StartSurface | FocalLength |
|---|---|---|
| 1 | 2 | 4.652 |
| 2 | 4 | 7.282 |
| 3 | 6 | −3.769 |
| 4 | 8 | 3.354 |
| 5 | 10 | Infinity |
| 6 | 12 | −10.443 |

TABLE 2-continued

Aspheric Surface Data

|  | Second Surface | Third Surface | Fourth Surface | Fifth Surface | Sixth Surface | Seventh Surface |
|---|---|---|---|---|---|---|
| k | 2.552788E+00 | 0.000000E+00 | 0.000000E+00 | 0.000000E+00 | 0.000000E+00 | 0.000000E+00 |
| A4 | −8.288541E−02 | −1.108184E−01 | −2.260006E−01 | −6.281862E−02 | −3.192172E−01 | −6.888263E−02 |
| A6 | 5.025854E−01 | 1.406017E−01 | 1.302999E+00 | −1.366884E+00 | −8.476567E−01 | −6.696498E−01 |
| A8 | −7.539170E+00 | −3.125169E+00 | −8.901926E+00 | 1.072936E+01 | 9.920121E+00 | 2.708282E+00 |
| A10 | 4.838840E+01 | 2.155673E+01 | 3.172768E+01 | −4.588612E+01 | −3.989589E+01 | −6.876610E+00 |
| A12 | −1.761689E+02 | −8.739839E+01 | −6.791860E+01 | 1.157633E+02 | 9.151750E+01 | 1.091617E+01 |
| A14 | 3.679086E+02 | 2.091941E+02 | 8.504580E+01 | −1.801489E+02 | −1.295555E+02 | −1.050370E+01 |
| A16 | −4.163666E+02 | −2.936265E+02 | −5.950615E+01 | 1.693073E+02 | 1.127278E+02 | 6.031197E+00 |
| A18 | 2.064688E+02 | 2.239320E+02 | 2.175801E+01 | −8.753616E+01 | −5.519686E+01 | −1.911708E+00 |
| A20 | −1.350499E+01 | −7.177253E+01 | −3.891827E+00 | 1.899342E+01 | 1.158118E+01 | 2.582543E−01 |

|  | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | −1.086950E+00 | 0.000000E+00 | −1.955560E+00 | −2.231695E+00 |
| A4 | 4.425412E−01 | 4.725169E−01 | 5.930641E−01 | 4.109461E−01 | −1.971001E−01 | −2.350097E−01 |
| A6 | −7.232898E−01 | −2.200704E−01 | −9.157698E−01 | −5.088428E−01 | −6.226603E−02 | 1.504123E−01 |
| A8 | 7.532620E−01 | −1.914584E−02 | 8.492741E−01 | 3.356287E−01 | 2.024619E−01 | −6.504672E−02 |
| A10 | −6.628242E−01 | −1.135392E−02 | −5.627053E−01 | −1.560391E−01 | −1.791050E−01 | 1.819287E−02 |
| A12 | 4.194150E−01 | 7.435447E−02 | 2.594462E−01 | 5.463741E−02 | 8.347312E−02 | −3.377621E−03 |
| A14 | −1.574341E−01 | −5.349803E−02 | −7.869002E−02 | −1.387009E−02 | −2.232885E−02 | 4.302682E−04 |
| A16 | 2.742782E−02 | 1.746792E−02 | 1.466974E−02 | 2.310107E−03 | 3.447497E−03 | −3.730003E−05 |
| A18 | −1.780603E−04 | −2.859564E−03 | −1.506948E−03 | −2.188978E−04 | −2.862580E−04 | 1.989425E−06 |
| A20 | −3.850383E−04 | 1.932069E−04 | 6.488019E−05 | 8.811565E−06 | 9.913717E−06 | −4.831976E−08 |

The imaging lens in Example 2 satisfies conditional expressions (1) to (22) as shown in Table 11.

Figure 4:
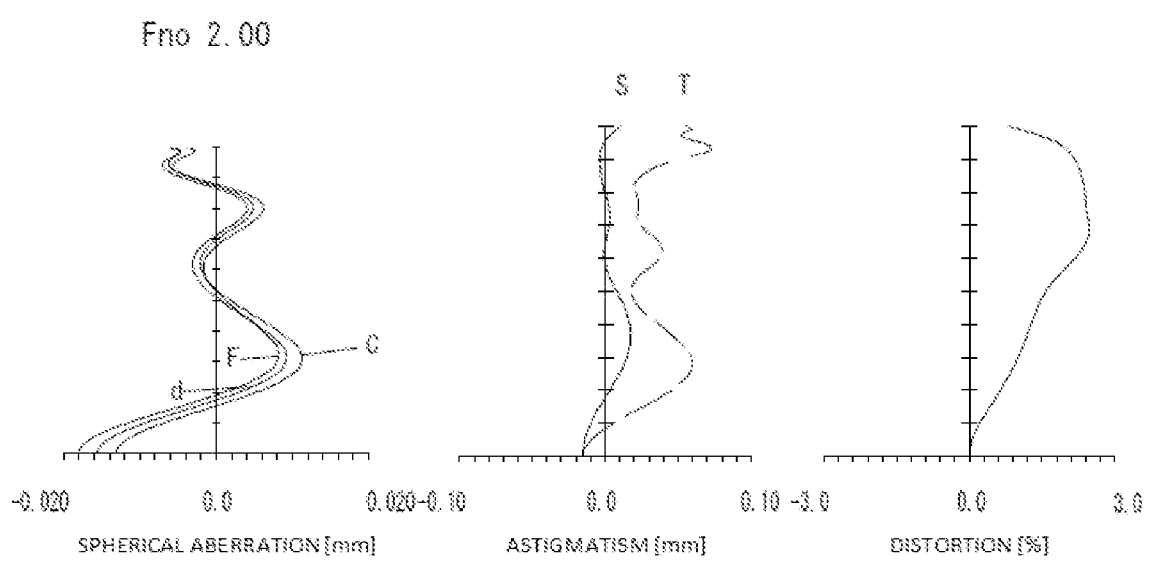
FIG. 4 shows spherical aberration, astigmatism, and distortion of the imaging lens in Example 2 according to the present invention.
Figure 5:
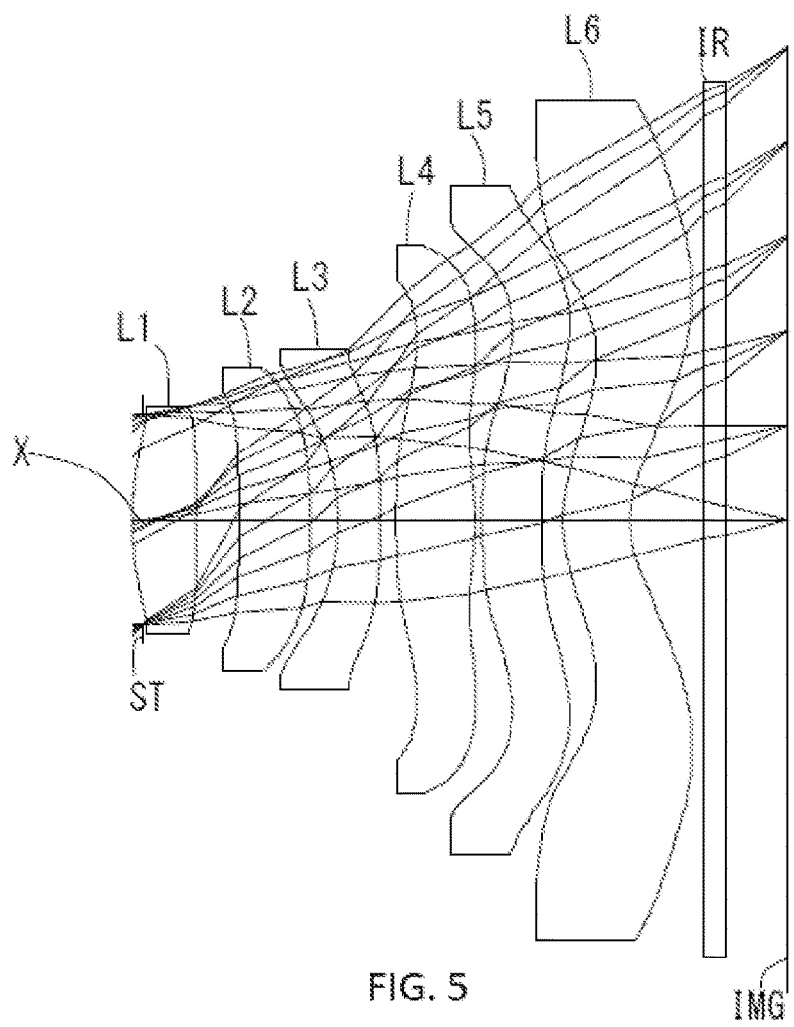
FIG. 5 is a schematic view showing an imaging lens in Example 3 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

Example 3

Unitmm f = 3.02
Fno = 2.00
ω(°) = 47.4
h = 3.28
TTL = 4.43

Surface Data

| i | r | d | Nd | vd | |
|---|---|---|---|---|---|
| (Object) | Infinity | Infinity | | | |
| 1 (Stop) | Infinity | −0.0670 | | | |
| 2* | 2.2326 | 0.4369 | 1.535 | 55.69 | (vd1) |
| 3* | 19.8280 | 0.3019 | | | |
| 4* | −104.5833 | 0.5001 | 1.535 | 55.69 | (vd2) |
| 5* | −4.0010 | 0.1877 | | | |
| 6* | −1.8842 | 0.2954 | 1.671 | 19.24 | (vd3) |
| 7* | −6.7131 | 0.1087 | | | |
| 8* | 17.6295 | 0.5508 | 1.544 | 55.93 | (vd4) |
| 9* | −1.9414 | 0.0504 | | | |
| 10* | Infinity | 0.4147 | 1.671 | 19.24 | (vd5) |
| 11* | Infinity | 0.1432 | | | |
| 12* | 1.1601 | 0.4669 | 1.614 | 25.59 | (vd6) |
| 13* | 0.7564 | 0.5205 | | | |
| 14 | Infinity | 0.1500 | 1.517 | 64.20 | |
| 15 | Infinity | 0.4215 | | | |
| n age P lan | Infinity | | | | |

TABLE 3-continued

| ConstituentLens Data | | |
|---|---|---|
| Lens | StartSurface | FocalLength |
| 1 | 2 | 4.664 |
| 2 | 4 | 7.765 |
| 3 | 6 | −4.004 |
| 4 | 8 | 3.245 |
| 5 | 10 | Infinity |
| 6 | 12 | −6.321 |

| Aspheric Surface Data | | | | | | |
|---|---|---|---|---|---|---|
|  | Second Surface | Third Surface | Fourth Surface | Fifth Surface | Sixth Surface | Seventh Surface |
| k | 2.409809E+00 | 0.000000E+00 | 0.000000E+00 | 0.000000E+00 | 0.000000E+00 | 0.000000E+00 |
| A4 | −7.990881E−02 | −9.984401E−02 | −1.802391E−01 | −4.166665E−02 | −1.786831E−01 | 1.793300E−02 |
| A6 | 4.247430E−01 | 9.749903E−02 | 1.041163E+00 | −1.096449E+00 | −1.190949E+00 | −1.013549E+00 |
| A8 | −5.586842E+00 | −2.226728E+00 | −6.487120E+00 | 7.845364E+00 | 8.544124E+00 | 3.315976E+00 |
| A10 | 3.242759E+01 | 1.435999E+01 | 2.121656E+01 | −3.064816E+01 | −2.843405E+01 | −6.966198E+00 |
| A12 | −1.076542E+02 | −5.337334E+01 | −4.141637E+01 | 7.071787E+01 | 5.750765E+01 | 9.759149E+00 |
| A14 | 2.054653E+02 | 1.168286E+02 | 4.740881E+01 | −1.006184E+02 | −7.368867E+01 | −8.739100E+00 |
| A16 | −2.125888E+02 | −1.499198E+02 | −3.038330E+01 | 8.644932E+01 | 5.863114E+01 | 4.798684E+00 |
| A18 | 9.638189E+01 | 1.045340E+02 | 1.015691E+01 | −4.086994E+01 | −2.633258E+01 | −1.471428E+00 |
| A20 | −5.763826E+00 | −3.063189E+01 | −1.661073E+00 | 8.111320E+00 | 5.069972E+00 | 1.928688E−01 |
|  | Eighth Surface | Ninth Surface | Tenth Surface | Eleventh Surface | Twelfth Surface | Thirteenth Surface |
| k | 0.000000E+00 | 0.000000E+00 | −1.086950E+00 | 0.000000E+00 | −1.943378E+00 | −3.065216E+00 |
| A4 | 3.473222E−01 | 5.301315E−01 | 6.472134E−01 | 5.015346E−01 | −1.710420E−01 | −1.346630E−01 |
| A6 | −4.519835E−01 | −3.222871E−01 | −1.078086E+00 | −7.089166E−01 | −1.524443E−02 | 6.907869E−02 |
| A8 | 2.982092E−01 | 3.687885E−02 | 1.088444E+00 | 5.782329E−01 | 8.846323E−02 | −2.919690E−02 |
| A10 | −1.447026E−01 | 2.583585E−02 | −7.688489E−01 | −3.285490E−01 | −7.529794E−02 | 9.118857E−03 |
| A12 | 6.498085E−02 | 1.487424E−02 | 3.676340E−01 | 1.286336E−01 | 3.264548E−02 | −2.041988E−03 |
| A14 | −2.746585E−02 | −2.413957E−02 | −1.138228E−01 | −3.330541E−02 | −7.982840E−03 | 3.165572E−04 |
| A16 | 8.575270E−03 | 1.035813E−02 | 2.157040E−02 | 5.374759E−03 | 1.116295E−03 | −3.156952E−05 |
| A18 | −1.564834E−03 | −1.986269E−03 | −2.259241E−03 | −4.857496E−04 | −8.359962E−05 | 1.788559E−06 |
| A20 | 1.215338E−04 | 1.472137E−04 | 9.991561E−05 | 1.868914E−05 | 2.607909E−06 | −4.330440E−08 |

The imaging lens in Example 3 satisfies conditional expressions (1) to (22) as shown in Table 11.

Figure 6:
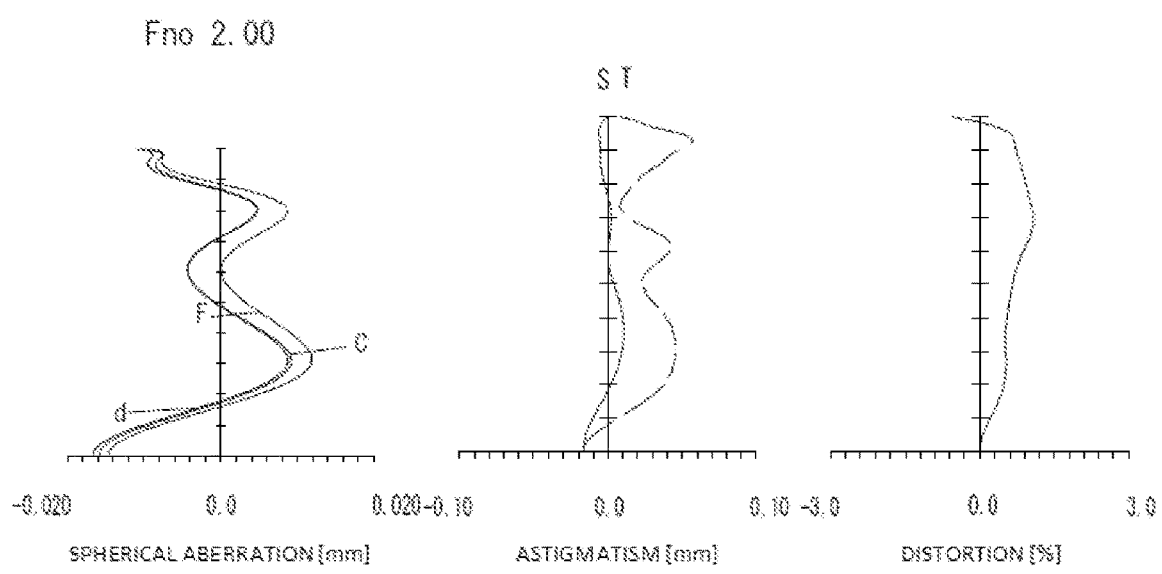
FIG. 6 shows spherical aberration, astigmatism, and distortion of the imaging lens in Example 3 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

| Example 4 | | | | |
|---|---|---|---|---|
| Unitmm | | | | |
| f = 2.92 | | | | |
| Fno = 2.00 | | | | |
| ω(°) = 47.5 | | | | |
| h = 3.28 | | | | |
| TTL = 4.37 | | | | |

| Surface Data | | | | | |
|---|---|---|---|---|---|
| i | r | d | Nd | vd | |
| (Object) | Infinity | Infinity | | | |
| 1 (Stop) | Infinity | −0.0670 | | | |
| 2* | 2.0579 | 0.4965 | 1.535 | 55.69 | (vd1) |
| 3* | 10.4315 | 0.3374 | | | |
| 4* | −100.5008 | 0.4971 | 1.535 | 55.69 | (vd2) |
| 5* | −3.6061 | 0.2652 | | | |
| 6* | −1.3121 | 0.2632 | 1.671 | 19.24 | (vd3) |
| 7* | −3.8372 | 0.0550 | | | |
| 8* | 13.1749 | 0.5438 | 1.544 | 55.93 | (vd4) |
| 9* | −1.9908 | 0.0500 | | | |
| 10* | 16.2309 | 0.3290 | 1.671 | 19.24 | (vd5) |
| 11* | −26.5528 | 0.1156 | | | |

TABLE 4-continued

| | | | | | |
|---|---|---|---|---|---|
| 12* | 1.0117 | 0.4200 | 1.614 | 25.59 | (vd6) |
| 13* | 0.6922 | 0.5417 | | | |
| 14 | Infinity | 0.1500 | 1.517 | 64.20 | |
| 15 | Infinity | 0.4225 | | | |
| n age P lan | Infinity | | | | |

ConstituentLens Data

| Lens | StartSurface | FocalLength |
|---|---|---|
| 1 | 2 | 4.696 |
| 2 | 4 | 6.981 |
| 3 | 6 | −3.102 |
| 4 | 8 | 3.218 |
| 5 | 10 | 15.065 |
| 6 | 12 | −7.139 |

Aspheric Surface Data

| | Second Surface | Third Surface | Fourth Surface | Fifth Surface | Sixth Surface | Seventh Surface |
|---|---|---|---|---|---|---|
| k | 2.481448E+00 | 0.000000E+00 | 0.000000E+00 | 0.000000E+00 | 0.000000E+00 | 0.000000E+00 |
| A4 | −8.121734E−02 | −9.055882E−02 | −2.327245E−01 | −6.361501E−02 | −3.423649E−01 | −1.742273E−01 |
| A6 | 5.617163E−01 | 1.226056E−01 | 1.249551E+00 | −1.349750E+00 | −2.574765E−01 | −6.982851E−02 |
| A8 | −7.467321E+00 | −2.915358E+00 | −8.533576E+00 | 1.034632E+01 | 8.189498E+00 | 6.269694E−01 |
| A10 | 4.656903E+01 | 2.050429E+01 | 3.024657E+01 | −4.386716E+01 | −3.775432E+01 | −1.952771E+00 |
| A12 | −1.668789E+02 | −8.266021E+01 | −6.422966E+01 | 1.095680E+02 | 9.256835E+01 | 3.368689E+00 |
| A14 | 3.447753E+02 | 1.960405E+02 | 7.965153E+01 | −1.688272E+02 | −1.381257E+02 | −3.369216E+00 |
| A16 | −3.863074E+02 | −2.724284E+02 | −5.521017E+01 | 1.570866E+02 | 1.257670E+02 | 2.007096E+00 |
| A18 | 1.896586E+02 | 2.057000E+02 | 1.998653E+01 | −8.042072E+01 | −6.394692E+01 | −6.684162E−01 |
| A20 | −1.228212E+01 | −6.527357E+01 | −3.539424E+00 | 1.728385E+01 | 1.381923E+01 | 9.625993E−02 |

| | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | −1.086950E+00 | 0.000000E+00 | −2.004171E+00 | −2.411007E+00 |
| A4 | 4.283927E−01 | 3.891088E−01 | 4.260309E−01 | 3.995481E−01 | −1.579061E−01 | −1.793145E−01 |
| A6 | −8.381816E−01 | −3.957960E−02 | −5.704172E−01 | −4.615161E−01 | −9.248047E−02 | 7.167789E−02 |
| A8 | 1.194810E+00 | −2.414864E−01 | 4.500828E−01 | 2.752172E−01 | 1.585154E−01 | −9.966863E−03 |
| A10 | −1.302147E+00 | 2.052467E−01 | −2.759017E−01 | −1.133668E−01 | −1.082490E−01 | −4.706450E−03 |
| A12 | 9.744627E−01 | −7.597804E−02 | 1.263888E−01 | 3.591832E−02 | 4.310979E−02 | 2.660347E−03 |
| A14 | −4.793113E−01 | 1.221369E−02 | −3.899617E−02 | −8.637803E−03 | −1.034071E−02 | −5.870657E−04 |
| A16 | 1.478377E−01 | 3.031229E−04 | 7.387497E−03 | 1.407745E−03 | 1.464464E−03 | 6.838773E−05 |
| A18 | −2.585711E−02 | −3.706086E−04 | −7.661670E−04 | −1.318992E−04 | −1.127467E−04 | −4.152092E−06 |
| A20 | 1.948837E−03 | 3.569197E−05 | 3.314196E−05 | 5.244238E−06 | 3.639041E−06 | 1.039027E−07 |

The imaging lens in Example 4 satisfies conditional expressions (1) to (22) as shown in Table 11.

Figure 8:
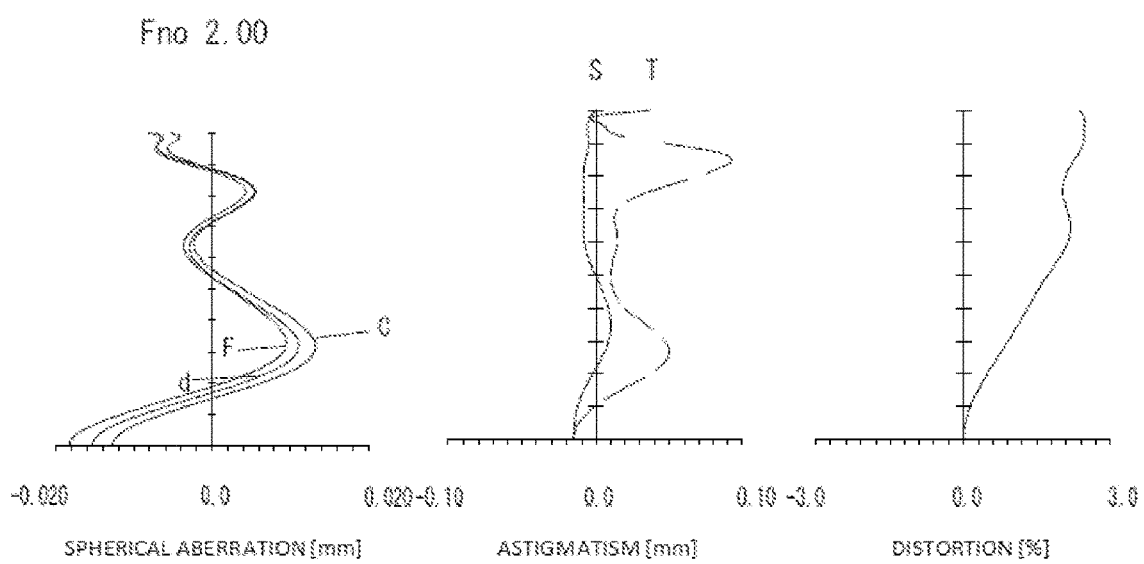
FIG. 8 shows spherical aberration, astigmatism, and distortion of the imaging lens in Example 4 according to the present invention.
Figure 9:
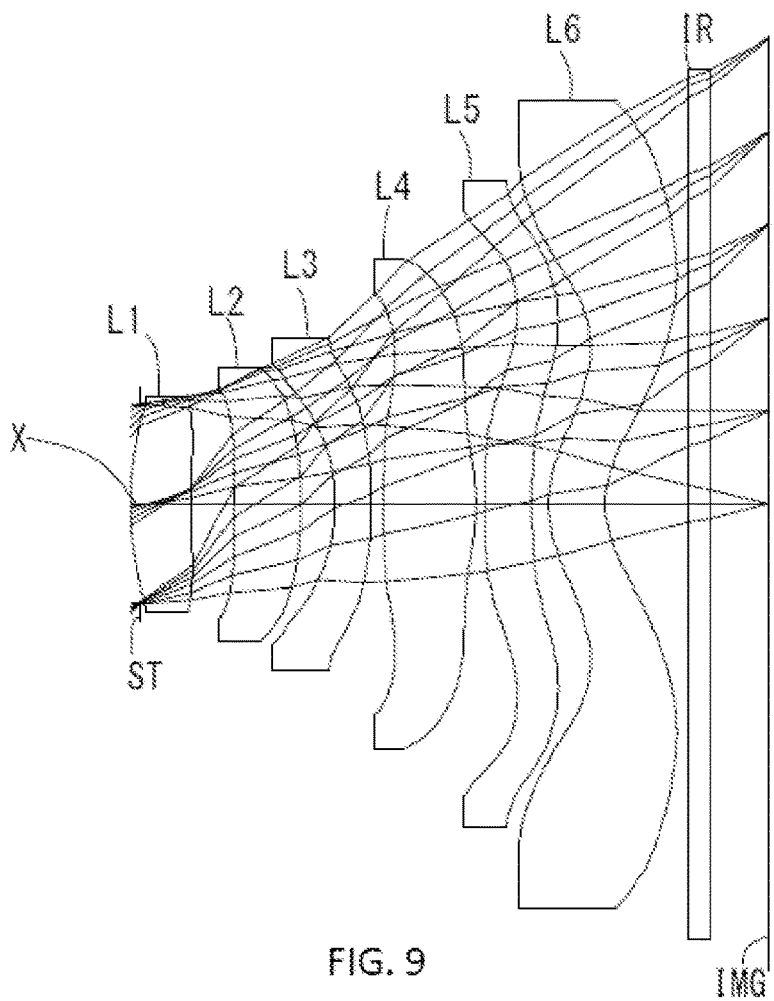
FIG. 9 is a schematic view showing an imaging lens in Example 5 according to the present invention.

FIG. 8 shows spherical aberration (mm), astigmatism (mm), and distortion (%) of the imaging lens in Example 4. As shown in FIG. 8, each aberration is corrected excellently.

Example 5

The basic lens data is shown below in Table 5.

TABLE 5

Example 5

Unitmm f = 2.90
Fno = 2.00
ω(°) = 48.2
h = 3.28
TTL = 4.37

Surface Data

| i | r | d | Nd | vd | |
|---|---|---|---|---|---|
| (Object) | Infinity | Infinity | | | |
| 1 (Stop) | Infinity | −0.0670 | | | |
| 2* | 2.1025 | 0.4347 | 1.535 | 55.69 | (vd1) |
| 3* | 10.3375 | 0.2914 | | | |
| 4* | −100.0000 | 0.4699 | 1.535 | 55.69 | (vd2) |
| 5* | −3.9129 | 0.2406 | | | |

TABLE 5-continued

| | | | | | |
|---|---|---|---|---|---|
| 6* | −1.4624 | 0.2564 | 1.671 | 19.24 | (vd3) |
| 7* | −3.7610 | 0.0854 | | | |
| 8* | 12.3230 | 0.6493 | 1.544 | 55.93 | (vd4) |
| 9* | −1.7617 | 0.0689 | | | |
| 10* | −14.0899 | 0.3230 | 1.671 | 19.24 | (vd5) |
| 11* | 13.1476 | 0.1156 | | | |
| 12* | 0.8037 | 0.3982 | 1.614 | 25.59 | (vd6) |
| 13* | 0.6403 | 0.5825 | | | |
| 14 | Infinity | 0.1500 | 1.517 | 64.20 | |
| 15 | Infinity | 0.4228 | | | |
| n age P lan | Infinity | | | | |

ConstituentLens Data

| Lens | StartSurface | FocalLength |
|---|---|---|
| 1 | 2 | 4.846 |
| 2 | 4 | 7.601 |
| 3 | 6 | −3.735 |
| 4 | 8 | 2.879 |
| 5 | 10 | −10.092 |
| 6 | 12 | −70.223 |

Aspheric Surface Data

| | Second Surface | Third Surface | Fourth Surface | Fifth Surface | Sixth Surface | Seventh Surface |
|---|---|---|---|---|---|---|
| k | 2.835732E+00 | 0.000000E+00 | 0.000000E+00 | 0.000000E+00 | 0.000000E+00 | 0.000000E+00 |
| A4 | −8.795405E−02 | −1.028361E−01 | −2.267032E−01 | −5.386461E−02 | −1.219530E−01 | −1.011131E−01 |
| A6 | 5.605986E−01 | 1.412899E−01 | 1.310844E+00 | −1.376015E+00 | −1.469762E+00 | −2.171188E−01 |
| A8 | −7.724713E+00 | −3.084596E+00 | −8.857933E+00 | 1.073946E+01 | 1.073639E+01 | 1.434662E+00 |
| A10 | 4.870782E+01 | 2.148982E+01 | 3.160020E+01 | −4.587549E+01 | −3.895026E+01 | −5.270274E+00 |
| A12 | −1.763733E+02 | −8.738955E+01 | −6.777737E+01 | 1.157646E+02 | 8.578546E+01 | 1.026592E+01 |
| A14 | 3.679086E+02 | 2.091941E+02 | 8.487139E+01 | −1.801646E+02 | −1.196706E+02 | −1.132242E+01 |
| A16 | −4.163666E+02 | −2.936265E+02 | −5.950615E+01 | 1.693084E+02 | 1.043039E+02 | 7.279304E+00 |
| A18 | 2.064688E+02 | 2.239320E+02 | 2.175801E+01 | −8.754735E+01 | −5.166447E+01 | −2.558553E+00 |
| A20 | −1.350499E+01 | −7.177253E+01 | −3.891827E+00 | 1.899342E+01 | 1.100841E+01 | 3.806203E−01 |

| | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | −1.086950E+00 | 0.000000E+00 | −2.668035E+00 | −2.310548E+00 |
| A4 | 5.740466E−02 | 2.857163E−01 | 6.825720E−01 | 4.003715E−01 | −1.191173E−01 | −1.903568E−01 |
| A6 | 6.743133E−01 | 2.745173E−01 | −9.849375E−01 | −5.116631E−01 | −8.848360E−02 | 8.672850E−02 |
| A8 | −2.274380E+00 | −7.818676E−01 | 8.768449E−01 | 3.343633E−01 | 1.381887E−01 | −1.991967E−02 |
| A10 | 3.500943E+00 | 7.369774E−01 | −5.722114E−01 | −1.561436E−01 | −1.020222E−01 | −7.666669E−04 |
| A12 | −3.305442E+00 | −3.979265E−01 | 2.637195E−01 | 5.629716E−02 | 4.447980E−02 | 1.722635E−03 |
| A14 | 2.001114E+00 | 1.354511E−01 | −8.038457E−02 | −1.486698E−02 | −1.147852E−02 | −4.568404E−04 |
| A16 | −7.558540E−01 | −2.867159E−02 | 1.508079E−02 | 2.563210E−03 | 1.721078E−03 | 5.875321E−05 |
| A18 | 1.621532E−01 | 3.428216E−03 | −1.559020E−03 | −2.490261E−04 | −1.387605E−04 | −3.865665E−06 |
| A20 | −1.510583E−02 | −1.752809E−04 | 6.751617E−05 | 1.019040E−05 | 4.656965E−06 | 1.044548E−07 |

The imaging lens in Example 5 satisfies conditional expressions (1) to (22) as shown in Table 11.

Figure 10:
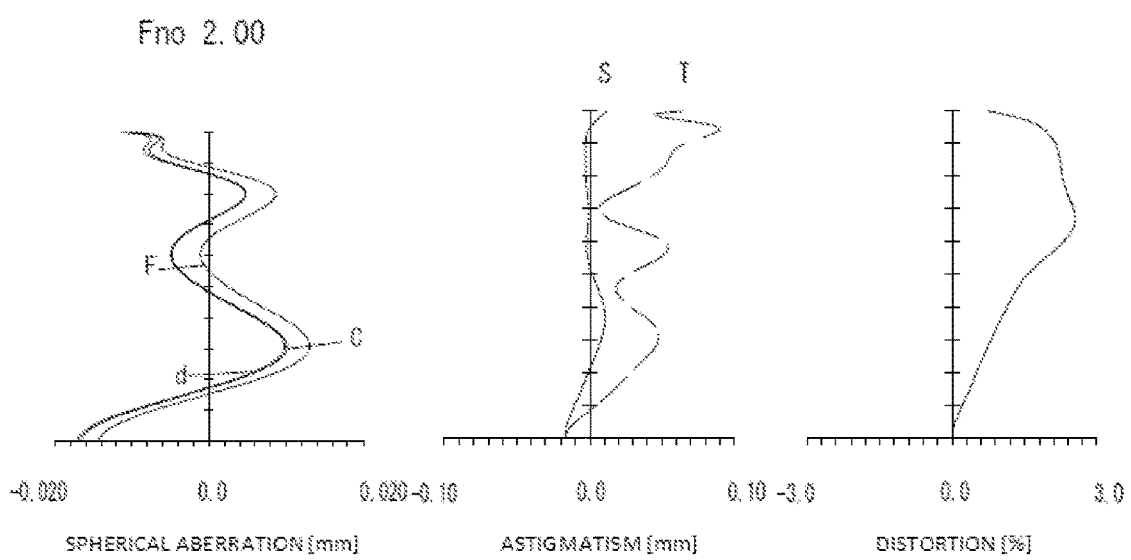
FIG. 10 shows spherical aberration, astigmatism, and distortion of the imaging lens in Example 5 according to the present invention.

FIG. 10 shows spherical aberration (mm), astigmatism (mm), and distortion (%) of the imaging lens in Example 5. As shown in FIG. 10, each aberration is corrected excellently.

Example 6

The basic lens data is shown below in Table 6.

TABLE 6

Example 6

Unitmm f = 2.92
Fno = 2.00
ω(°) = 47.5
h = 3.28
TTL = 4.37

TABLE 6-continued

Surface Data

| i | r | d | Nd | νd | |
|---|---|---|---|---|---|
| (Object) | Infinity | Infinity | | | |
| 1 (Stop) | Infinity | −0.0670 | | | |
| 2* | 2.0579 | 0.4965 | 1.535 | 55.69 | (νd1) |
| 3* | 10.4315 | 0.3374 | | | |
| 4* | −100.5008 | 0.4971 | 1.535 | 55.69 | (νd2) |
| 5* | −3.6061 | 0.2652 | | | |
| 6* | −1.3121 | 0.2632 | 1.671 | 19.24 | (νd3) |
| 7* | −3.8372 | 0.0550 | | | |
| 8* | 13.1749 | 0.5438 | 1.544 | 55.93 | (νd4) |
| 9* | −1.9908 | 0.0500 | | | |
| 10* | 16.2309 | 0.3290 | 1.671 | 19.24 | (νd5) |
| 11* | −26.5528 | 0.1156 | | | |
| 12* | 1.0117 | 0.4200 | 1.614 | 25.59 | (νd6) |
| 13* | 0.6922 | 0.5417 | | | |
| 14 | Infinity | 0.1500 | 1.517 | 64.20 | |
| 15 | Infinity | 0.4228 | | | |
| n age P lan | Infinity | | | | |

ConstituentLens Data

| Lens | StartSurface | FocalLength |
|---|---|---|
| 1 | 2 | 4.696 |
| 2 | 4 | 6.981 |
| 3 | 6 | −3.102 |
| 4 | 8 | 3.218 |
| 5 | 10 | 15.065 |
| 6 | 12 | −7.139 |

Aspheric Surface Data

| | Second Surface | Third Surface | Fourth Surface | Fifth Surface | Sixth Surface | Seventh Surface |
|---|---|---|---|---|---|---|
| k | 2.481448E+00 | 0.000000E+00 | 0.000000E+00 | 0.000000E+00 | 0.000000E+00 | 0.000000E+00 |
| A4 | −8.121734E−02 | −9.055882E−02 | −2.327245E−01 | −6.361501E−02 | −3.423649E−01 | −1.742273E−01 |
| A6 | 5.617163E−01 | 1.226056E−01 | 1.249551E+00 | −1.349750E+00 | −2.574765E−01 | −6.982851E−02 |
| A8 | −7.467321E+00 | −2.915358E+00 | −8.533576E+00 | 1.034632E+01 | 8.189498E+00 | 6.269694E−01 |
| A10 | 4.656903E+01 | 2.050429E+01 | 3.024657E+01 | −4.386716E+01 | −3.775432E+01 | −1.952771E+00 |
| A12 | −1.668789E+02 | −8.266021E+01 | −6.422966E+01 | 1.095680E+02 | 9.256835E+01 | 3.368689E+00 |
| A14 | 3.447753E+02 | 1.960405E+02 | 7.965153E+01 | −1.688272E+02 | −1.381257E+02 | −3.369216E+00 |
| A16 | −3.863074E+02 | −2.724284E+02 | −5.521017E+01 | 1.570866E+02 | 1.257867E+02 | 2.007096E+00 |
| A18 | 1.896586E+02 | 2.057000E+02 | 1.998653E+01 | −8.042072E+01 | −6.394692E+01 | −6.684162E−01 |
| A20 | −1.228212E+01 | −6.527357E+01 | −3.539424E+00 | 1.728385E+01 | 1.381923E+01 | 9.625993E−02 |

| | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | −1.086950E+00 | 0.000000E+00 | −2.004171E+00 | −2.411007E+00 |
| A4 | 4.283927E−01 | 3.891088E−01 | 4.260309E−01 | 3.995481E−01 | −1.579061E−01 | −1.793145E−01 |
| A6 | −8.381816E−01 | −3.957960E−02 | −5.704172E−01 | −4.615161E−01 | −9.248047E−02 | 7.167789E−02 |
| A8 | 1.194810E+00 | −2.414864E−01 | 4.500828E−01 | 2.752172E−01 | 1.585154E−01 | −9.966863E−03 |
| A10 | −1.302147E+00 | 2.052467E−01 | −2.759017E−01 | −1.133668E−01 | −1.082490E−01 | −4.706450E−03 |
| A12 | 9.744627E−01 | −7.597804E−02 | 1.263888E−01 | 3.591832E−02 | 4.310979E−02 | 2.660347E−03 |
| A14 | −4.793113E−01 | 1.221369E−02 | −3.899617E−02 | −8.637803E−03 | −1.034071E−02 | −5.870657E−04 |

TABLE 6-continued

| | | | | | | |
|---|---|---|---|---|---|---|
| A16 | 1.478377E−01 | 3.031229E−04 | 7.387497E−03 | 1.407745E−03 | 1.464464E−03 | 6.838773E−05 |
| A18 | −2.585711E−02 | −3.706086E−04 | −7.661670E−04 | −1.318992E−04 | −1.127467E−04 | −4.152092E−06 |
| A20 | 1.948837E−03 | 3.569197E−05 | 3.314196E−05 | 5.244238E−06 | 3.639041E−06 | 1.039027E−07 |

The imaging lens in Example 6 satisfies conditional expressions (1) to (22) as shown in Table 11.

Figure 12:
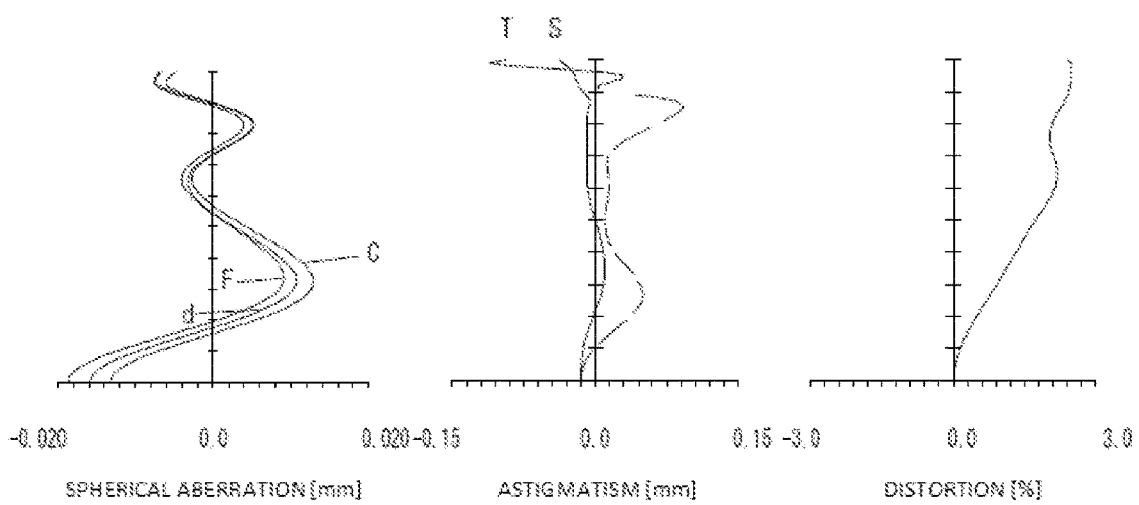
FIG. 12 shows spherical aberration, astigmatism, and distortion of the imaging lens in Example 6 according to the present invention.
Figure 13:
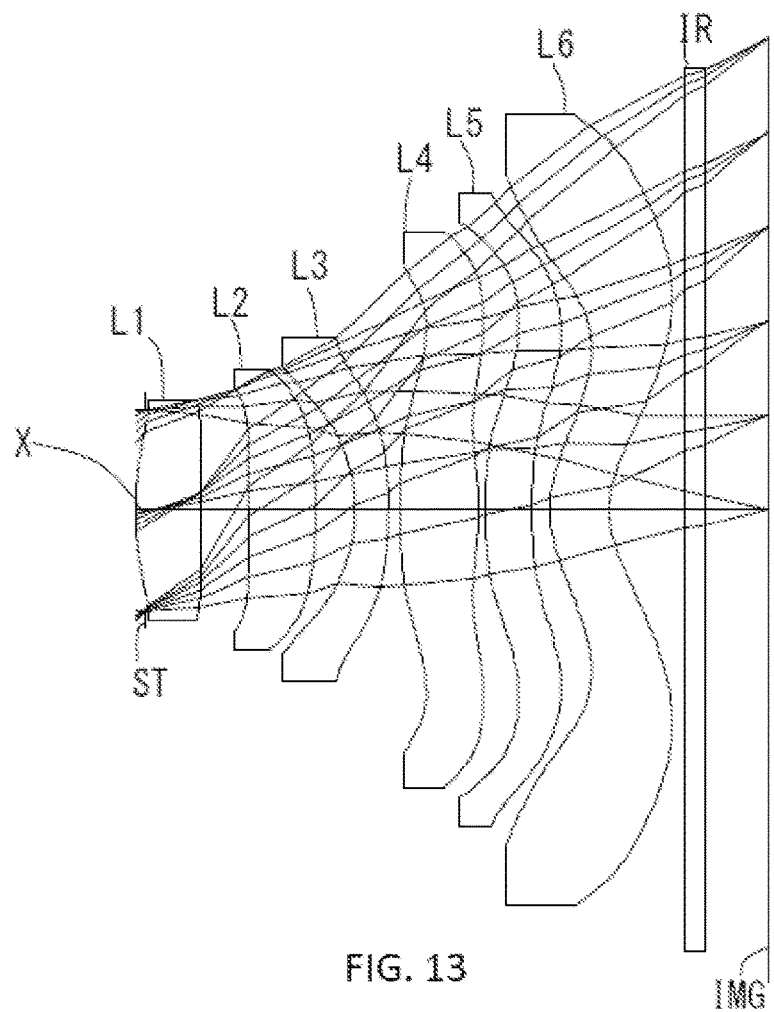
FIG. 13 is a schematic view showing an imaging lens in Example 7 according to the present invention.

FIG. 12 shows spherical aberration (mm), astigmatism (mm), and distortion (%) of the imaging lens in Example 6. As shown in FIG. 12, each aberration is corrected excellently.

Example 7

The basic lens data is shown below in Table 7.

TABLE 7

Example 7

Unit mm $f = 2.88$
$Fno = 2.00$
$\omega(°) = 48.3$
$h = 3.28$
$TTL = 4.28$

Surface Data

| i | r | d | Nd | vd | |
|---|---|---|---|---|---|
| (Object) | Infinity | Infinity | | | |
| 1 (Stop) | Infinity | −0.0670 | | | |
| 2* | 2.1761 | 0.4508 | 1.535 | 55.69 | (vd1) |
| 3* | 9.6039 | 0.3368 | | | |
| 4* | 13.7102 | 0.4685 | 1.535 | 55.69 | (vd2) |
| 5* | −4.2903 | 0.2736 | | | |
| 6* | −1.3126 | 0.2333 | 1.671 | 19.24 | (vd3) |
| 7* | −3.1843 | 0.0847 | | | |
| 8* | 16.1429 | 0.5391 | 1.544 | 55.93 | (vd4) |
| 9* | −1.9874 | 0.0546 | | | |
| 10* | 14.6119 | 0.3230 | 1.671 | 19.24 | (vd5) |
| 11* | 7.7714 | 0.1226 | | | |
| 12* | 0.8897 | 0.4126 | 1.614 | 25.59 | (vd6) |
| 13* | 0.6996 | 0.5280 | | | |
| 14 | Infinity | 0.1500 | 1.517 | 64.20 | |
| 15 | Infinity | 0.4228 | | | |
| n age P lan | Infinity | | | | |

ConstituentLens Data

| Lens | StartSurface | FocalLength |
|---|---|---|
| 1 | 2 | 5.152 |
| 2 | 4 | 6.166 |
| 3 | 6 | −3.504 |
| 4 | 8 | 3.285 |
| 5 | 10 | −25.227 |
| 6 | 12 | −30.604 |

Aspheric Surface Data

| | Second Surface | Third Surface | Fourth Surface | Fifth Surface | Sixth Surface | Seventh Surface |
|---|---|---|---|---|---|---|
| k | 2.783507E+00 | 0.000000E+00 | 0.000000E+00 | 0.000000E+00 | 0.000000E+00 | 0.000000E+00 |
| A4 | −9.209165E−02 | −1.082123E−01 | −2.283321E−01 | −6.524085E−02 | −2.781595E−01 | −9.801745E−02 |
| A6 | 5.459930E−01 | 1.306038E−01 | 1.317208E+00 | −1.419295E+00 | −1.232212E+00 | −6.653189E−01 |
| A8 | −7.634697E+00 | −3.091319E+00 | −8.945385E+00 | 1.071901E+01 | 1.241830E+01 | 2.850620E+00 |
| A10 | 4.849145E+01 | 2.161818E+01 | 3.173774E+01 | −4.586768E+01 | −4.949819E+01 | −7.402890E+00 |
| A12 | −1.761400E+02 | −8.743862E+01 | −6.781690E+01 | 1.157861E+02 | 1.144050E+02 | 1.218956E+01 |
| A14 | 3.679086E+02 | 2.091941E+02 | 8.494250E+01 | −1.801434E+02 | −1.628924E+02 | −1.222267E+01 |

TABLE 7-continued

| | | | | | | |
|---|---|---|---|---|---|---|
| A16 | −4.163666E+02 | −2.936265E+02 | −5.950615E+01 | 1.693002E+02 | 1.417593E+02 | 7.275830E+00 |
| A18 | 2.064688E+02 | 2.239320E+02 | 2.175801E+01 | −8.755836E+01 | −6.922914E+01 | −2.378821E+00 |
| A20 | −1.350499E+01 | −7.177253E+01 | −3.891827E+00 | 1.898722E+01 | 1.450012E+01 | 3.312359E−01 |

| | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | −1.086950E+00 | 0.000000E+00 | −2.151403E+00 | −2.133593E+00 |
| A4 | 4.069072E−01 | 4.563443E−01 | 6.563308E−01 | 4.983126E−01 | −1.404751E−01 | −2.713897E−01 |
| A6 | −5.984807E−01 | −4.949271E−02 | −1.088823E+00 | −7.764886E−01 | −1.602695E−01 | 1.787313E−01 |
| A8 | 5.762830E−01 | −3.738854E−01 | 1.046754E+00 | 6.344442E−01 | 3.089106E−01 | −7.776646E−02 |
| A10 | −4.760569E−01 | 3.856335E−01 | −7.148129E−01 | −3.586173E−01 | −2.536001E−01 | 2.119988E−02 |
| A12 | 3.032356E−01 | −1.876640E−01 | 3.406019E−01 | 1.422971E−01 | 1.151599E−01 | −3.659224E−03 |
| A14 | −1.287466E−01 | 5.100860E−02 | −1.073993E−01 | −3.797184E−02 | −3.048336E−02 | 4.060903E−04 |
| A16 | 3.219440E−02 | −7.556417E−03 | 2.098770E−02 | 6.369099E−03 | 4.691531E−03 | −2.874110E−05 |
| A18 | −4.071131E−03 | 5.018204E−04 | −2.281597E−03 | −5.996910E−04 | −3.899332E−04 | 1.203063E−06 |
| A20 | 1.834459E−04 | −4.910446E−06 | 1.049468E−04 | 2.402574E−05 | 1.355303E−05 | −2.275391E−08 |

The imaging lens in Example 7 satisfies conditional expressions (1) to (22) as shown in Table 11.

Figure 14:
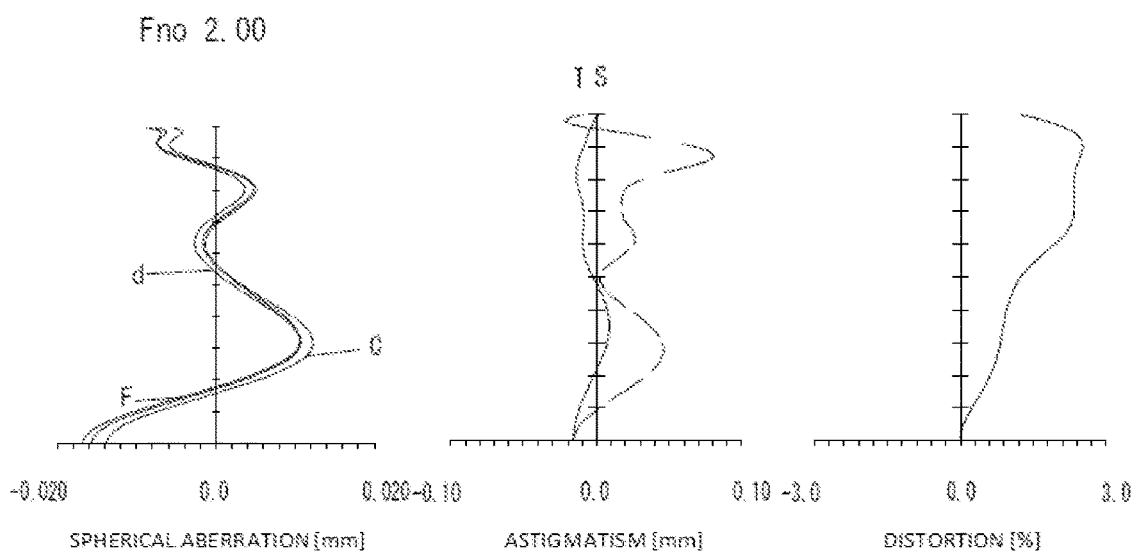
FIG. 14 shows spherical aberration, astigmatism, and distortion of the imaging lens in Example 7 according to the present invention.
Figure 15:
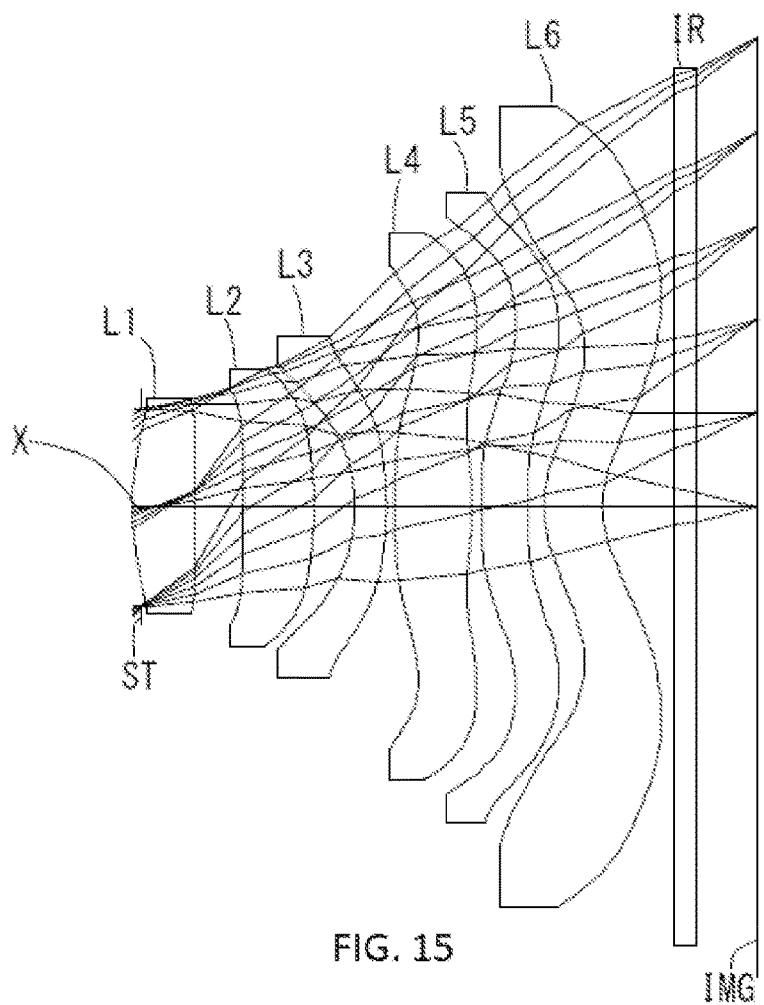
FIG. 15 is a schematic view showing an imaging lens in Example 8 according to the present invention.

FIG. 14 shows spherical aberration (mm), astigmatism (mm), and distortion (%) of the imaging lens in Example 7. As shown in FIG. 14, each aberration is corrected excellently.

Example 8

The basic lens data is shown below in Table 8.

TABLE 8

Example 8

Unit mm f = 2.88
Fno = 2.00
ω(°) = 48.3
h = 3.28
TTL = 4.26

Surface Data

| i | r | d | Nd | νd | |
|---|---|---|---|---|---|
| (Object) | Infinity | Infinity | | | |
| 1 (Stop) | Infinity | −0.0670 | | | |
| 2* | 2.0844 | 0.4264 | 1.535 | 55.69 | (vd1) |
| 3* | 8.6192 | 0.3444 | | | |
| 4* | 24.6921 | 0.4957 | 1.535 | 55.69 | (vd2) |
| 5* | −3.9539 | 0.2919 | | | |
| 6* | −1.2560 | 0.2200 | 1.671 | 19.24 | (vd3) |
| 7* | −2.7735 | 0.0614 | | | |
| 8* | 17.5296 | 0.5393 | 1.544 | 55.93 | (vd4) |
| 9* | −1.9391 | 0.0659 | | | |
| 10* | 19.3393 | 0.3230 | 1.671 | 19.24 | (vd5) |
| 11* | 6.3019 | 0.1156 | | | |
| 12* | 0.8532 | 0.4066 | 1.614 | 25.59 | (vd6) |
| 13* | 0.6911 | 0.5142 | | | |
| 14 | Infinity | 0.1500 | 1.517 | 64.20 | |
| 15 | Infinity | 0.4230 | | | |
| n age P lan | Infinity | | | | |

Constituent Lens Data

| Lens | StartSurface | FocalLength |
|---|---|---|
| 1 | 2 | 5.026 |
| 2 | 4 | 6.411 |
| 3 | 6 | −3.634 |
| 4 | 8 | 3.239 |
| 5 | 10 | −14.077 |
| 6 | 12 | −130.207 |

TABLE 8-continued

Aspheric Surface Data

|  | Second Surface | Third Surface | Fourth Surface | Fifth Surface | Sixth Surface | Seventh Surface |
|---|---|---|---|---|---|---|
| k | 2.693645E+00 | 0.000000E+00 | 0.000000E+00 | 0.000000E+00 | 0.000000E+00 | 0.000000E+00 |
| A4 | −9.203591E−02 | −1.057204E−01 | −2.260770E−01 | −6.170039E−02 | −2.784290E−01 | −1.053741E−01 |
| A6 | 5.303724E−01 | 1.503430E−01 | 1.311550E+00 | −1.426672E+00 | −1.411069E+00 | −5.720653E−01 |
| A8 | −7.608580E+00 | −3.157436E+00 | −8.960279E+00 | 1.072066E+01 | 1.487710E+01 | 2.888685E+00 |
| A10 | 4.844793E+01 | 2.167690E+01 | 3.181448E+01 | −4.586513E+01 | −6.101536E+01 | −8.305704E+00 |
| A12 | −1.761319E+02 | −8.744531E+01 | −6.782970E+01 | 1.157908E+02 | 1.433567E+02 | 1.427718E+01 |
| A14 | 3.679089E+02 | 2.091924E+02 | 8.492986E+01 | −1.801451E+02 | −2.073229E+02 | −1.464211E+01 |
| A16 | −4.163666E+02 | −2.936360E+02 | −5.950916E+01 | 1.692993E+02 | 1.834408E+02 | 8.880166E+00 |
| A18 | 2.064688E+02 | 2.239320E+02 | 2.175404E+01 | −8.755901E+01 | −9.106395E+01 | −2.960592E+00 |
| A20 | −1.350499E+01 | −7.177253E+01 | −3.891827E+00 | 1.898649E+01 | 1.936269E+01 | 4.209900E−01 |

|  | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | −1.086950E+00 | 0.000000E+00 | −2.169930E+00 | −2.324078E+00 |
| A4 | 3.992187E−01 | 5.092453E−01 | 7.804914E−01 | 5.579223E−01 | −1.607932E−01 | −2.361665E−01 |
| A6 | −4.655850E−01 | −1.057145E−01 | −1.388777E+00 | −9.293681E−01 | −1.223920E−01 | 1.245717E−01 |
| A8 | 1.659183E−01 | −4.074535E−01 | 1.482594E+00 | 8.325527E−01 | 2.399357E−01 | −3.871233E−02 |
| A10 | 1.212391E−01 | 4.880590E−01 | −1.119806E+00 | −5.178188E−01 | −1.897259E−01 | 5.801273E−03 |
| A12 | −1.975378E−01 | −2.700781E−01 | 5.777621E−01 | 2.216141E−01 | 8.408052E−02 | −3.003244E−05 |
| A14 | 1.267587E−01 | 8.455074E−02 | −1.938565E−01 | −6.216477E−02 | −2.192097E−02 | −1.185925E−04 |
| A16 | −4.686484E−02 | −1.500977E−02 | 4.000163E−02 | 1.074351E−02 | 3.338849E−03 | 1.662669E−05 |
| A18 | 9.676046E−03 | 1.352302E−03 | −4.593684E−03 | −1.029459E−03 | −2.753265E−04 | −9.311396E−07 |
| A 20 | −8.514674E−04 | −4.286996E−05 | 2.245918E−04 | 4.170112E−05 | 9.507839E−06 | 1.868537E−08 |

The imaging lens in Example 8 satisfies conditional expressions (1) to (22) as shown in Table 11.

Figure 16:
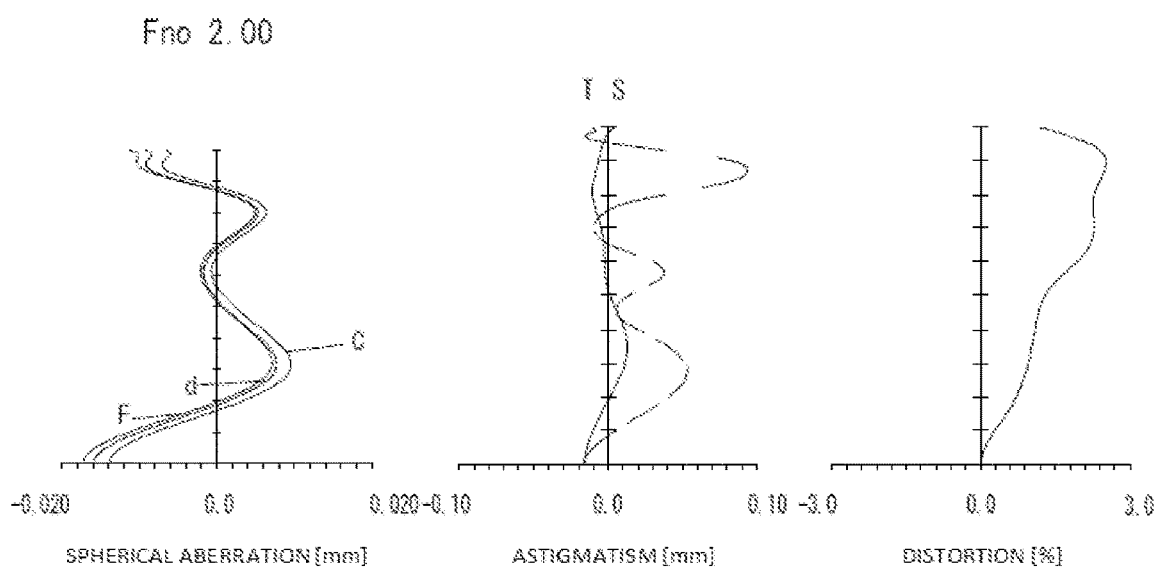
FIG. 16 shows spherical aberration, astigmatism, and distortion of the imaging lens in Example 8 according to the present invention.
Figure 17:
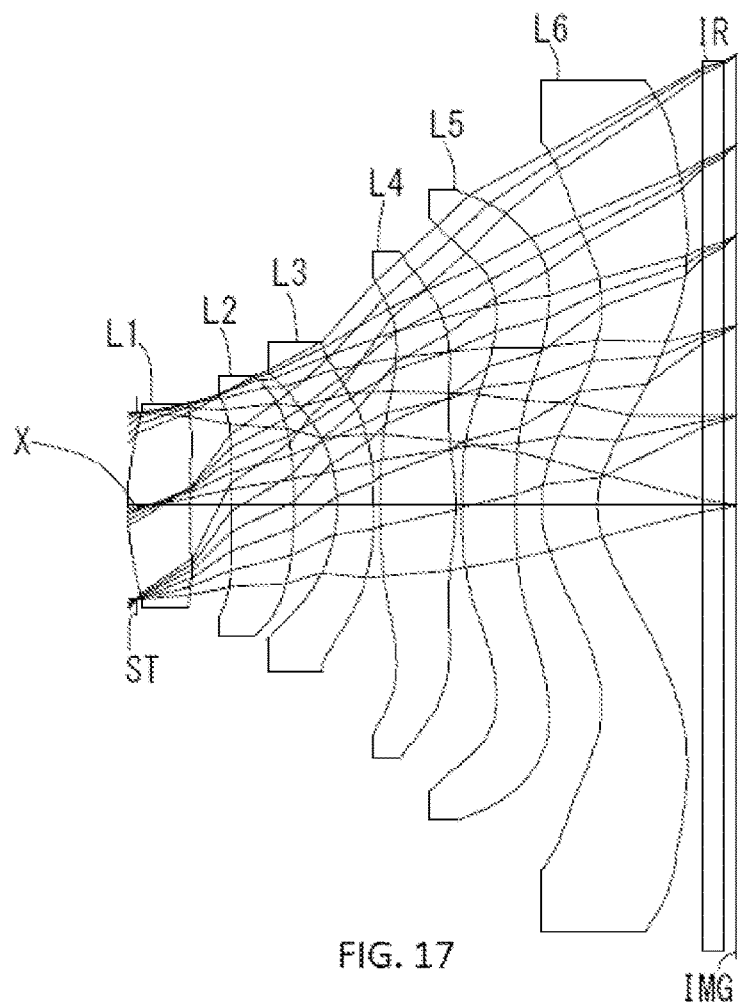
FIG. 17 is a schematic view showing an imaging lens in Example 9 according to the present invention.

FIG. 16 shows spherical aberration (mm), astigmatism (mm), and distortion (%) of the imaging lens in Example 8. As shown in FIG. 16, each aberration is corrected excellently.

Example 9

The basic lens data is shown below in Table 9.

TABLE 9

Example 9

Unitmm $f = 2.81$
$Fno = 2.00$
$\omega(°) = 48.9$
$h = 3.28$
$TTL = 4.31$

Surface Data

| i | r | d | Nd | vd |  |
|---|---|---|---|---|---|
| (Object) | Infinity | Infinity |  |  |  |
| 1 (Stop) | Infinity | −0.0670 |  |  |  |
| 2* | 2.0910 | 0.4544 | 1.535 | 55.69 | (vd1) |
| 3* | 9.0108 | 0.2940 |  |  |  |
| 4* | 52.6100 | 0.4555 | 1.535 | 55.69 | (vd2) |
| 5* | −4.1623 | 0.3137 |  |  |  |
| 6* | −1.3317 | 0.2723 | 1.671 | 19.24 | (vd3) |
| 7* | −2.8499 | 0.0500 |  |  |  |
| 8* | 80.8320 | 0.5434 | 1.544 | 55.93 | (vd4) |
| 9* | −1.9285 | 0.0508 |  |  |  |
| 10* | Infinity | 0.3860 | 1.535 | 55.69 | (vd5) |
| 11* | Infinity | 0.1853 |  |  |  |
| 12* | 0.8926 | 0.4072 | 1.614 | 25.59 | (vd6) |
| 13* | 0.6745 | 0.7633 |  |  |  |
| 14 | Infinity | 0.1500 | 1.517 | 64.20 |  |
| 15 | Infinity | 0.1001 |  |  |  |
| n age P lan | Infinity |  |  |  |  |

TABLE 9-continued

| ConstituentLens Data | | |
|---|---|---|
| Lens | StartSurface | FocalLength |
| 1 | 2 | 4.977 |
| 2 | 4 | 7.232 |
| 3 | 6 | −4.016 |
| 4 | 8 | 3.468 |
| 5 | 10 | Infinity |
| 6 | 12 | −15.530 |

| Aspheric Surface Data | | | | | | |
|---|---|---|---|---|---|---|
| | Second Surface | Third Surface | Fourth Surface | Fifth Surface | Sixth Surface | Seventh Surface |
| k | 2.927928E+00 | 0.000000E+00 | 0.000000E+00 | 0.000000E+00 | 0.000000E+00 | 0.000000E+00 |
| A4 | −8.707770E−02 | −1.056914E−01 | −2.241316E−01 | −7.704442E−02 | −3.514147E−01 | −9.789131E−02 |
| A6 | 5.213086E−01 | 1.487505E−01 | 1.272970E+00 | −1.364826E+00 | −9.680265E−01 | −6.700198E−01 |
| A8 | −7.572974E+00 | −3.161001E+00 | −8.856455E+00 | 1.070710E+01 | 1.119098E+01 | 3.107069E+00 |
| A10 | 4.842113E+01 | 2.165962E+01 | 3.169996E+01 | −4.589723E+01 | −4.335726E+01 | −7.678988E+00 |
| A12 | −1.761534E+02 | −8.745285E+01 | −6.794046E+01 | 1.157720E+02 | 9.572261E+01 | 1.131293E+01 |
| A14 | 3.679086E+02 | 2.091941E+02 | 8.510355E+01 | −1.801288E+02 | −1.319577E+02 | −1.009723E+01 |
| A16 | −4.163666E+02 | −2.936265E+02 | −5.950615E+01 | 1.693304E+02 | 1.134963E+02 | 5.424784E+00 |
| A18 | 2.064688E+02 | 2.239320E+02 | 2.175801E+01 | −8.757457E+01 | −5.564427E+01 | −1.628824E+00 |
| | Eighth Surface | Ninth Surface | Tenth Surface | Eleventh Surface | Twelfth Surface | Thirteenth Surface |
| A20 | −1.350499E+01 | −7.177253E+01 | −3.891827E+00 | 1.899342E+01 | 1.178876E+01 | 2.115500E−01 |
| k | 0.000000E+00 | 0.000000E+00 | −1.086950E+00 | 0.000000E+00 | −1.826914E+00 | −2.107284E+00 |
| A4 | 3.735296E−01 | 4.182756E−01 | 6.368862E−01 | 4.321130E−01 | −1.363414E−01 | −1.612274E−01 |
| A6 | −5.507401E−01 | −1.122066E−01 | −9.744002E−01 | −4.982682E−01 | −5.326182E−03 | 8.470234E−02 |
| A8 | 5.912107E−01 | −1.794801E−01 | 9.245234E−01 | 3.215130E−01 | 5.010111E−02 | −3.057842E−02 |
| A10 | −6.405217E−01 | 1.296539E−01 | −6.366663E−01 | −1.472369E−01 | −3.520124E−02 | 7.401953E−03 |
| A12 | 5.380793E−01 | 5.595756E−03 | 3.045430E−01 | 5.044307E−02 | 1.225101E−02 | −1.268143E−03 |
| A14 | −2.958975E−01 | −3.763660E−02 | −9.523383E−02 | −1.252071E−02 | −2.405929E−03 | 1.585019E−04 |
| A16 | 9.879352E−02 | 1.679014E−02 | 1.821908E−02 | 2.056117E−03 | 2.710834E−04 | −1.365302E−05 |
| A18 | −1.815794E−02 | −3.172444E−03 | −1.917337E−03 | −1.947662E−04 | −1.640353E−05 | 6.990766E−07 |
| A20 | 1.410405E−03 | 2.297568E−04 | 8.468092E−05 | 7.946645E−06 | 4.145240E−07 | −1.558070E−08 |

The imaging lens in Example 9 satisfies conditional expressions (1) to (22) as shown in Table 11.

Figure 18:
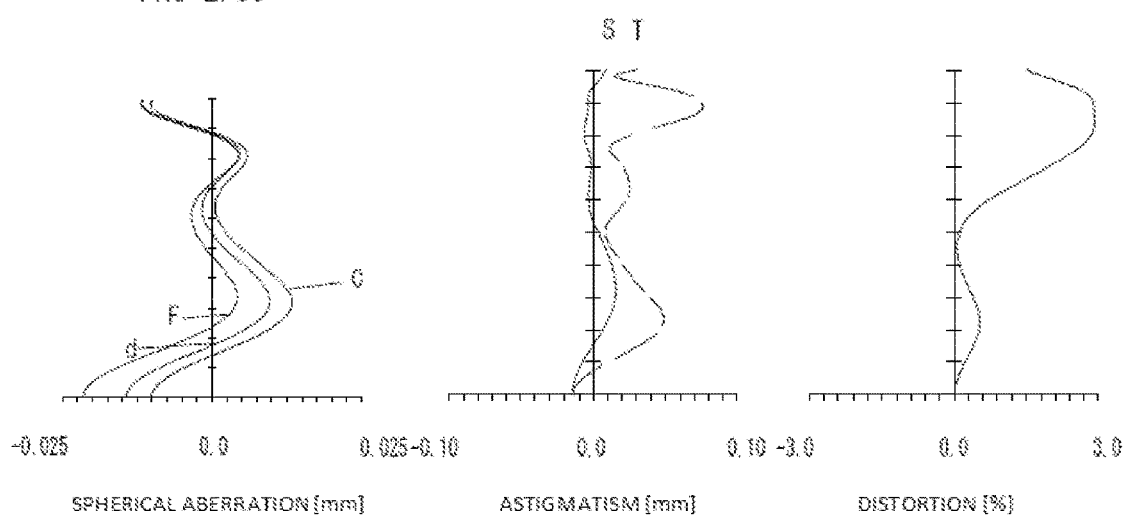
FIG. 18 shows spherical aberration, astigmatism, and distortion of the imaging lens in Example 9 according to the present invention.

FIG. 18 shows spherical aberration (mm), astigmatism (mm), and distortion (%) of the imaging lens in Example 9. As shown in FIG. 18, each aberration is corrected excellently.

Example 10

The basic lens data is shown below in Table 10.

TABLE 10

Example 10

Unitmm f = 2.89
Fno = 2.00
ω(°) = 48.1
h = 3.28
TTL = 4.20

| Surface Data | | | | | |
|---|---|---|---|---|---|
| i | r | d | Nd | vd | |
| (Object) | Infinity | Infinity | | | |
| 1 (Stop) | Infinity | −0.0670 | | | |
| 2* | 2.0198 | 0.4182 | 1.535 | 55.69 | (vd1) |
| 3* | 9.3760 | 0.2952 | | | |
| 4* | 33.6508 | 0.4500 | 1.535 | 55.69 | (vd2) |
| 5* | −4.3352 | 0.2762 | | | |
| 6* | −1.4323 | 0.3316 | 1.671 | 19.24 | (vd3) |
| 7* | −3.0353 | 0.0550 | | | |
| 8* | −329.1179 | 0.4646 | 1.544 | 55.93 | (vd4) |
| 9* | −1.9648 | 0.0500 | | | |

TABLE 10-continued

| | | | | | |
|---|---|---|---|---|---|
| 10* | Infinity | 0.3230 | 1.535 | 55.69 | (vd5) |
| 11* | Infinity | 0.1156 | | | |
| 12* | 0.9979 | 0.4184 | 1.614 | 25.59 | (vd6) |
| 13* | 0.7124 | 0.5432 | | | |
| 14 | Infinity | 0.1500 | 1.517 | 64.20 | |
| 15 | Infinity | 0.4225 | | | |
| n age P lan | Infinity | | | | |

ConstituentLens Data

| Lens | StartSurface | FocalLength |
|---|---|---|
| 1 | 2 | 4.720 |
| 2 | 4 | 7.211 |
| 3 | 6 | −4.410 |
| 4 | 8 | 3.630 |
| 5 | 10 | Infinity |
| 6 | 12 | −9.163 |

Aspheric Surface Data

| | Second Surface | Third Surface | Fourth Surface | Fifth Surface | Sixth Surface | Seventh Surface |
|---|---|---|---|---|---|---|
| k | 2.396627E+00 | 0.000000E+00 | 0.000000E+00 | 0.000000E+00 | 0.000000E+00 | 0.000000E+00 |
| A4 | −8.812193E−02 | −1.228381E−01 | −2.297164E−01 | −7.066794E−02 | −3.907471E−01 | −2.028362E−01 |
| A6 | 5.063749E−01 | 1.520879E−01 | 1.293273E+00 | −1.378388E+00 | −4.329788E−01 | −2.868314E−01 |
| A8 | −7.626183E+00 | −3.130961E+00 | −8.903491E+00 | 1.073147E+01 | 9.474820E+00 | 2.483961E+00 |
| A10 | 4.854190E+01 | 2.150583E+01 | 3.178516E+01 | −4.588032E+01 | −4.157779E+01 | −7.529904E+00 |
| A12 | −1.762506E+02 | −8.726167E+01 | −6.785474E+01 | 1.157694E+02 | 9.990876E+01 | 1.278841E+01 |
| A14 | 3.679086E+02 | 2.091941E+02 | 8.510105E+01 | −1.801433E+02 | −1.468488E+02 | −1.289532E+01 |
| A16 | −4.163666E+02 | −2.936265E+02 | −5.950615E+01 | 1.693052E+02 | 1.315768E+02 | 7.716881E+00 |
| A18 | 2.064688E+02 | 2.239320E+02 | 2.175801E+01 | −8.754804E+01 | −6.577864E+01 | −2.541274E+00 |
| A20 | −1.350499E+01 | −7.177253E+01 | −3.891827E+00 | 1.899342E+01 | 1.399204E+01 | 3.559566E−01 |

| | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | −1.086950E+00 | 0.000000E+00 | −2.129474E+00 | −2.610390E+00 |
| A4 | 4.249879E−01 | 6.173496E−01 | 6.665379E−01 | 4.694205E−01 | −1.572526E−01 | −1.623929E−01 |
| A6 | −4.970370E−01 | −3.027078E−01 | −1.064031E+00 | −5.765304E−01 | −3.924341E−02 | 7.573064E−02 |
| A8 | 3.121089E−01 | −1.983579E−01 | 1.023678E+00 | 3.788347E−01 | 1.261752E−01 | −2.264977E−02 |
| A10 | −2.125682E−01 | 3.354547E−01 | −7.013839E−01 | −1.744306E−01 | −1.070120E−01 | 3.499517E−03 |
| A12 | 1.737334E−01 | −1.984833E−01 | 3.336004E−01 | 6.073431E−02 | 4.768947E−02 | −2.506053E−04 |
| A14 | −1.038958E−01 | 6.499883E−02 | −1.045841E−01 | −1.571725E−02 | −1.213225E−02 | 3.051881E−05 |
| A16 | 3.591356E−02 | −1.244130E−02 | 2.025252E−02 | 2.772941E−03 | 1.770302E−03 | −8.643750E−06 |
| A18 | −6.412120E−03 | 1.304585E−03 | −2.174767E−03 | −2.909038E−04 | −1.381907E−04 | 1.031354E−06 |
| A20 | 4.582272E−04 | −5.741306E−05 | 9.861593E−05 | 1.355634E−05 | 4.483656E−06 | −4.107781E−08 |

The imaging lens in Example 10 satisfies conditional expressions (1) to (22) as shown in Table 11.

Figure 20:
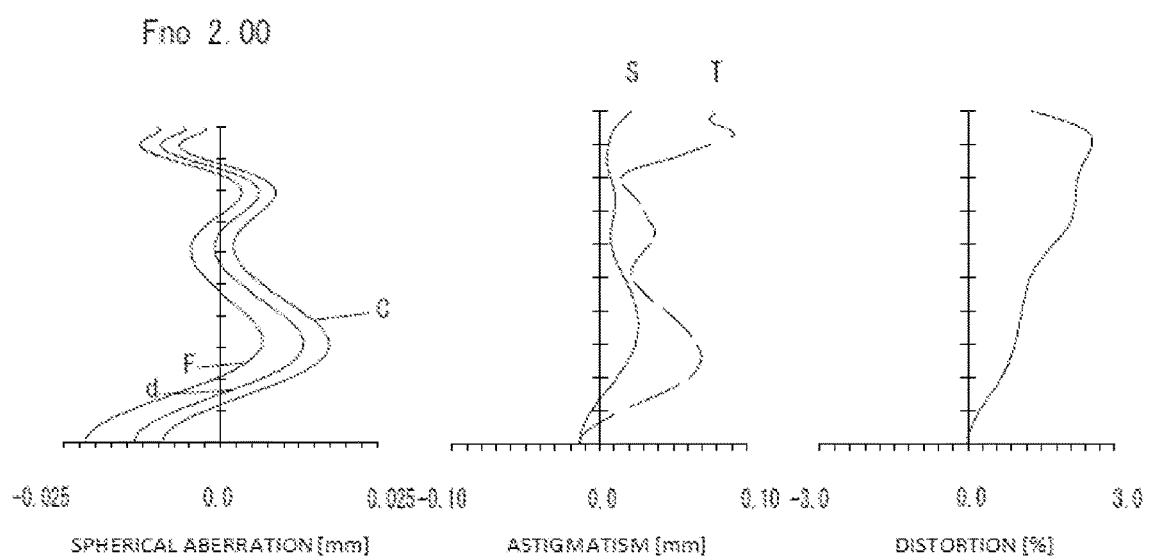
FIG. 20 shows spherical aberration, astigmatism, and distortion of the imaging lens in Example 10 according to the present invention.

FIG. 20 shows spherical aberration (mm), astigmatism (mm), and distortion (%) of the imaging lens in Example 10. As shown in FIG. 20, each aberration is corrected excellently.

In table 11, values of conditional expressions (1) to (22) related to Examples 1 to 10 are shown.

TABLE 11

| | Conditional Expressions | Example 1 | Example 2 | Example 3 | Example 4 | Example 5 |
|---|---|---|---|---|---|---|
| (1) | f 1/f 4 | 1.42 | 1.39 | 1.44 | 1.46 | 1.68 |
| (2) | r 6/f | −1.67 | −1.47 | −2.23 | −1.31 | −1.30 |
| (3) | vd 6 | 25.59 | 25.59 | 25.59 | 25.59 | 25.59 |
| (4) | (T 2/f 2) × 1 0 0 | 3.38 | 3.22 | 2.42 | 3.80 | 3.17 |
| (5) | r 6/r 1 2 | −7.21 | −6.12 | −8.87 | −5.54 | −5.87 |
| (6) | r 8/r 1 1 | −2.09 | −1.96 | −1.67 | −1.97 | −2.19 |
| (7) | r 2/r 4/r 6 | 0.51 | 0.66 | 0.74 | 0.75 | 0.70 |
| (8) | | r 3 |/f | 34.76 | 34.64 | 34.67 | 34.38 | 34.51 |
| (9) | r 4/f | −1.30 | −1.30 | −1.33 | −1.23 | −1.35 |
| (10) | (T 1/f 1) × 1 0 0 | 5.88 | 5.88 | 6.47 | 7.18 | 6.01 |
| (11) | T 2/T 4 | 4.88 | 3.60 | 3.73 | 5.30 | 3.49 |
| (12) | f 1/f | 1.64 | 1.61 | 1.55 | 1.61 | 1.67 |
| (13) | f 1/f 2 | 0.65 | 0.64 | 0.60 | 0.67 | 0.64 |
| (14) | f 3/f 4 | −1.06 | −1.12 | −1.23 | −0.96 | −1.30 |
| (15) | f 6/f 1 | −2.96 | −2.24 | −1.36 | −1.52 | −14.49 |
| (16) | r 2/r 4 | −2.43 | −2.78 | −4.96 | −2.89 | −2.64 |
| (17) | r 2/T 2 | 37.16 | 44.50 | 105.64 | 39.34 | 42.97 |
| (18) | | r 3 |/f 2 | 13.84 | 13.73 | 13.47 | 14.40 | 13.16 |
| (19) | r 4/r 6 | 0.78 | 0.89 | 0.60 | 0.94 | 1.04 |
| (20) | | r 7 |/f | 14.68 | 26.45 | 5.84 | 4.51 | 4.25 |
| (21) | r 8/f | −0.65 | −0.65 | −0.64 | −0.68 | −0.61 |
| (22) | r 1 1/r 1 2 | 1.34 | 1.38 | 1.53 | 1.46 | 1.26 |
| | Conditional Expressions | Example 6 | Example 7 | Example 8 | Example 9 | Example 10 |
| (1) | f 1/f 4 | 1.46 | 1.57 | 1.55 | 1.44 | 1.30 |
| (2) | r 6/f | −1.31 | −1.11 | −0.96 | −1.02 | −1.05 |
| (3) | vd 6 | 25.59 | 25.59 | 25.59 | 25.59 | 25.59 |
| (4) | (T 2/f 2) × 1 0 0 | 3.80 | 4.44 | 4.55 | 4.34 | 3.83 |
| (5) | r 6/r 1 2 | −5.54 | −4.55 | −4.01 | −4.23 | −4.26 |
| (6) | r 8/r 1 1 | −1.97 | −2.23 | −2.27 | −2.16 | −1.97 |
| (7) | r 2/r 4/r 6 | 0.75 | 0.70 | 0.79 | 0.76 | 0.71 |
| (8) | | r 3 |/f | 34.38 | 4.76 | 8.59 | 18.75 | 11.64 |
| (9) | r 4/f | −1.23 | −1.49 | −1.38 | −1.48 | −1.50 |
| (10) | (T 1/f 1) × 1 0 0 | 7.18 | 6.54 | 6.85 | 5.91 | 6.25 |
| (11) | T 2/T 4 | 5.30 | 5.01 | 4.43 | 6.17 | 5.52 |
| (12) | f 1/f | 1.61 | 1.79 | 1.75 | 1.77 | 1.63 |
| (13) | f 1/f 2 | 0.67 | 0.84 | 0.78 | 0.69 | 0.65 |
| (14) | f 3/f 4 | −0.96 | −1.07 | −1.12 | −1.16 | −1.21 |
| (15) | f 6/f 1 | −1.52 | −5.94 | −25.90 | −3.12 | −1.94 |
| (16) | r 2/r 4 | −2.89 | −2.24 | −2.18 | −2.16 | −2.16 |
| (17) | r 2/T 2 | 39.34 | 35.11 | 29.53 | 28.73 | 33.94 |

TABLE 11-continued

| | | | | | | |
|---|---|---|---|---|---|---|
| (18) | \|r3\|/f2 | 14.40 | 2.22 | 3.85 | 7.27 | 4.67 |
| (19) | r4/r6 | 0.94 | 1.35 | 1.43 | 1.46 | 1.43 |
| (20) | \|r7\|/f | 4.51 | 5.61 | 6.10 | 28.81 | 113.83 |
| (21) | r8/f | −0.68 | −0.69 | −0.67 | −0.69 | −0.68 |
| (22) | r11/r12 | 1.46 | 1.27 | 1.23 | 1.32 | 1.40 |

When the imaging lens according to the present invention is adopted to a product with the camera function, there is realized contribution to the low profile and the low F-number of the camera and also high performance thereof.

DESCRIPTION OF REFERENCE NUMERALS

ST: aperture stop
L1: first lens
L2: second lens
L3: third lens
L4: fourth lens
L5: fifth lens
L6: sixth lens
ih: maximum image height
IR: filter
IMG: imaging plane

What is claimed is:

1. An imaging lens comprising in order from an object side to an image side,
   a first lens with positive refractive power being formed in a meniscus shape having an object-side surface being convex in a paraxial region,
   a second lens with positive refractive power in a paraxial region,
   a third lens with negative refractive power in a paraxial region,
   a fourth lens with positive refractive power in a paraxial region,
   a fifth lens having aspheric surfaces on both sides, and
   a sixth lens with negative refractive power having an image-side surface being concave in a paraxial region,
   wherein the following conditional expressions (1), (2) and (4) are satisfied:

$$0.30 < f1/f4 < 1.85 \tag{1}$$

$$-3.30 < r6/f < -0.70 \tag{2}$$

$$1.50 < (T2/f2) \times 100 < 5.50 \tag{4}$$

where
f1: a focal length of the first lens,
f4: a focal length of the fourth lens,
r6: a paraxial curvature radius of an image-side surface of the third lens,
f: a focal length of the overall optical system of the imaging lens,
T2: a distance along the optical axis from an image-side surface of the second lens to an object-side surface of the third lens, and
f2: a focal length of the second lens.

2. The imaging lens according to claim 1, wherein the following conditional expression (5) is satisfied:

$$-12.50 < r6/r12 < -3.20 \tag{5}$$

where
r6: a paraxial curvature radius of an image-side surface of the third lens, and
r12: a paraxial curvature radius of an image-side surface of the sixth lens.

3. The imaging lens according to claim 1, wherein the following conditional expression (6) is satisfied:

$$-3.50 < r8/r11 < -1.10 \tag{6}$$

where
r8: a paraxial curvature radius of an image-side surface of the fourth lens, and
r11: a paraxial curvature radius of an object-side surface of the sixth lens.

4. The imaging lens according to claim 1, wherein the following conditional expression (7) is satisfied:

$$0.40 < r2/r4/r6 < 1.20 \tag{7}$$

where
r2: a paraxial curvature radius of an image-side surface of the first lens,
r4: a paraxial curvature radius of an image-side surface of the second lens, and
r6: a paraxial curvature radius of an image-side surface of the third lens.

5. The imaging lens according to claim 1, wherein the following conditional expression (8) is satisfied:

$$3.75 < |r3|/f < 70.00 \tag{8}$$

where
r3: a paraxial curvature radius of an object-side surface of the second lens, and
f: a focal length of the overall optical system of the imaging lens.

* * * * *